US012700963B2

(12) United States Patent
Liu et al.

(10) Patent No.: US 12,700,963 B2
(45) Date of Patent: Aug. 4, 2026

(54) SYSTEM AND METHOD FOR UPLINK TIMING IN MULTI-POINT COMMUNICATIONS

(71) Applicant: Huawei Technologies Co., Ltd., Shenzhen (CN)

(72) Inventors: Jialing Liu, Palatine, IL (US); Weimin Xiao, Hoffman Estates, IL (US); Qian Cheng, Naperville, IL (US); Zhigang Rong, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 529 days.

(21) Appl. No.: 18/165,032

(22) Filed: Feb. 6, 2023

(65) Prior Publication Data

US 2023/0188283 A1 Jun. 15, 2023

Related U.S. Application Data

(63) Continuation of application No. PCT/US2020/045269, filed on Aug. 6, 2020.

(51) Int. Cl.
*H04W 72/541* (2023.01)
*H04L 5/00* (2006.01)
(Continued)

(52) U.S. Cl.
CPC ....... *H04L 5/0048* (2013.01); *H04W 72/0453* (2013.01); *H04W 72/21* (2023.01); *H04W 72/541* (2023.01)

(58) Field of Classification Search
CPC ..... H04L 5/0048; H04L 5/0051; H04L 5/001; H04L 5/0035; H04L 5/0092;
(Continued)

(56) References Cited

U.S. PATENT DOCUMENTS

| | | | | |
|---|---|---|---|---|
| 9,204,411 B2 * | 12/2015 | Chen | ................. | H04W 56/0045 |
| 2013/0064165 A1 * | 3/2013 | Chen | ................. | H04W 56/0045 |
| | | | | 370/312 |

(Continued)

FOREIGN PATENT DOCUMENTS

| | | | | |
|---|---|---|---|---|
| CN | 110291762 B | 5/2022 | | |
| EP | 3852466 A1 * | 7/2021 | ........ | H04W 74/0833 |

(Continued)

OTHER PUBLICATIONS

"3rd Generation Partnership Project; Technical Specification Group Radio Access Network; NR; Physical channels and modulation (Release 16)," 3GPP TS 38.211 V16.10.0, Technical Specification, (Jun. 2022), 134 pages.
(Continued)

*Primary Examiner* — Jay P Patel
(74) *Attorney, Agent, or Firm* — Slater Matsil, LLP

(57) ABSTRACT

A user equipment (UE) may receive first configuration information of a carrier of a serving cell, including a first association of a first group of uplink (UL) signals or channels on the carrier in the serving cell with a first UL timing advance group (TAG) of the UE, and second configuration information of the carrier including a second association of a second group of UL signals or channels on the carrier with a second UL TAG of the UE. The UE may transmit a UL signal/channel in the first group of UL signals or channels according to a TA value of the first UL TAG, and transmit a UL signal/channel in the second group of UL signals or channels according to a TA value of the second UL TAG.

19 Claims, 18 Drawing Sheets

(51) Int. Cl.
  *H04W 72/0453*          (2023.01)
  *H04W 72/21*            (2023.01)
(58) Field of Classification Search
  CPC ............ H04L 5/0007; H04W 72/0453; H04W
                  72/21; H04W 72/541; H04W 56/0045;
                                      H04W 56/0015
  See application file for complete search history.

(56)                  References Cited

U.S. PATENT DOCUMENTS

| | | | | |
|---|---|---|---|---|
| 2014/0219185 | A1* | 8/2014 | Etemad ................. | H04L 1/0026 |
| | | | | 370/329 |
| 2015/0163750 | A1* | 6/2015 | Zhang ................. | H04W 52/146 |
| | | | | 455/509 |
| 2017/0346685 | A1* | 11/2017 | Wang ..................... | H04L 5/001 |
| 2018/0213536 | A1* | 7/2018 | Yang ................. | H04W 56/0045 |
| 2019/0141695 | A1 | 5/2019 | Babaei et al. | |
| 2019/0261291 | A1* | 8/2019 | Liu .................... | H04W 72/0473 |
| 2020/0059281 | A1 | 2/2020 | Grant et al. | |
| 2020/0100201 | A1 | 3/2020 | Farmanbar et al. | |
| 2020/0145082 | A1 | 5/2020 | Chen | |
| 2020/0260500 | A1* | 8/2020 | Agiwal ............. | H04W 28/0278 |
| 2020/0275490 | A1* | 8/2020 | Li ......................... | H04L 1/1812 |
| 2022/0078737 | A1* | 3/2022 | Takeda ............. | H04W 56/0045 |
| 2022/0141869 | A1* | 5/2022 | Jeon ...................... | H04L 5/0053 |
| | | | | 370/329 |
| 2022/0279453 | A1* | 9/2022 | Dinan .................. | H04W 72/21 |
| 2024/0260090 | A1* | 8/2024 | Jeon ...................... | H04L 5/0048 |
| 2024/0373470 | A1* | 11/2024 | Jeon ...................... | H04W 74/08 |
| 2024/0381420 | A1* | 11/2024 | Jeon ...................... | H04L 5/0051 |
| 2024/0430820 | A1* | 12/2024 | Jeon ................. | H04W 74/0866 |

FOREIGN PATENT DOCUMENTS

| | | | | | |
|---|---|---|---|---|---|
| EP | | 3639606 | B1 * | 3/2025 | ........ H04W 56/0005 |
| WO | WO-2015018095 | A1 * | | 2/2015 | ........ H04W 56/0045 |
| WO | WO-2022020060 | A1 * | | 12/2022 | ........ H04W 56/0045 |

OTHER PUBLICATIONS

"3rd Generation Partnership Project; Technical Specification Group Radio Access Network; NR; Multiplexing and channel coding (Release 16)," 3GPP TS 38.212 V16.10.0, Technical Specification, (Jun. 2022), 153 pages.

"3rd Generation Partnership Project; Technical Specification Group Radio Access Network; NR; Physical layer procedures for control (Release 16)," 3GPP TS 38.213 V16.12.0, Technical Specification, (Dec. 2022), 191 pages.

"3rd Generation Partnership Project; Technical Specification Group Radio Access Network; NR; Physical layer procedures for data (Release 16)," 3GPP TS 38.214 V16.12.0, Technical Specification, (Dec. 2022), 176 pages.

"3rd Generation Partnership Project; Technical Specification Group Radio Access Network; NR;Medium Access Control (MAC) protocol specification (Release 16)," 3GPP TS 38.321 V16.11.0, Technical Specification, (Dec. 2022), 159 pages.

"3rd Generation Partnership Project; Technical Specification Group Radio Access Network; NR;Radio Resource Control (RRC) protocol specification (Release 16)," 3GPP TS 38.331 V16.11.0, Technical Specification, (Dec. 2022), 971 pages.

Samsung, "Multi-TA procedures for Multi TRP", 3GPP TSG RAN WG1 Meeting #90, R1-1713581, Aug. 21-25, 2017, 4 pages, Prague, P.R. Czechia.

\* cited by examiner

– TAG-Config

The IE *TAG-Config* is used to configure parameters for a time-alignment group.

*TAG-Config information element*

-- ASN1START

-- TAG-TAG-CONFIG-START

TAG-Config ::=     SEQUENCE { tag-ToReleaseList     SEQUENCE (SIZE (1..maxNrofTAGs)) OF TAG-Id     OPTIONAL,     --Need N tag-ToAddModList     SEQUENCE (SIZE (1..maxNrofTAGs)) OF TAG     OPTIONAL     --Need N

}

TAG ::=     SEQUENCE { tag-Id     TAG-Id, timeAlignmentTimer     TimeAlignmentTimer,

...

}

TAG-Id ::=     INTEGER (0..maxNrofTAGs-1)

TimeAlignmentTimer::=     ENUMERATED {ms500, ms750, ms1280, ms1930, ms2560, ms5130, ms10240, infinity}

-- TAG-TAG-CONFIG-STOP

-- ASN1STOP

| TAG field descriptions |
| --- |
| *tag-Id*<br>Indicates the TAG of the SpCell or an SCell, see TS 38.331 [3]. Uniquely identifies the TAG within the scope of a Cell Group (i.e. MCG or SCG). |
| *timeAlignmentTimer*<br>Value in ms of the *timeAlignmentTimer* for TAG with ID *tag-Id*, as specified in TS 38.331 [3]. |

*ServingCellConfig information element*

-- ASN1START

-- TAG-SERVINGCELLCONFIG-START

ServingCellConfig ::=     SEQUENCE ( tag-Id     TAG-Id,

...

| *tag-Id*<br>Timing Advance Group ID, as specified in TS 38.331 [3], which this cell belongs to. |
| --- |

FIG. 2

| NUMEROLOGY | SCS (kHz) | NORMAL CP (µs) |
|---|---|---|
| 0 | 15 | 4.69 |
| 1 | 30 | 2.34 |
| 2 | 60 | 1.17 |
| 3 | 130 | 0.59 |
| 4 | 240 | 0.29 |
| 5 | 480 | 0.15 |
| [6] | 960 | 0.08 |

| FUNCTIONALITY | ID1 | ID2 | ID3 | ID4 | ID5 | ID6 | ID7 |
|---|---|---|---|---|---|---|---|
| | PL RS SEQUENCE GENERATION | MSG 2 PDCCH DMRS SEQUENCE GENERATION | MSG 2 PDCCH SCRAMBLING/ RANDOMIZATION | MSG 2 PDSCH DMRS SEQUENCE GENERATION | MSG 2 PDSCH SCRAMBLING | MSG 3 PUSCH DMRS SEQUENCE GENERATION | MSG 3 PUSCH SCRAMBLING |
| FIRST GROUP OF IDs | ID1,1 | ID2,1 | ID3,1 | ID4,1 | ID5,1 | ID6,1 | ID7,1 |
| SECOND GROUP OF IDs | ID1,2 | ID2,2 | ID3,2 | ID4,2 | ID5,2 | ID6,2 | ID7,2 |
| THIRD GROUP OF IDs | ID1,3 | ID2,3 | ID3,3 | ID4,3 | ID5,3 | ID6,3 | ID7,3 |

610

620

630

800

```
SSB-Configuration-r17    ::=    SEQUENCE {
    carrierFreq-r17         ARFCN-ValueNR,
    halfFrameIndex-r17      ENUMERATED {zero, one},
    ssbSubcarrierSpacing-r17   SubcarrierSpacing,
    ssb-periodicity-r17     ENUMERATED { ms5, ms10, ms30, ms40, ms80, ms160, spare2, spare1 }   OPTIONAL, --Need S
    smtc-r17                SSB-MTC                                                              OPTIONAL, --Need S
    sfn-Offset-r17          INTEGER (0..maxNrofFFS-r16),
    sfn-SSB-Offset-r17      INTEGER (0..15),
    ss-PBCH-BlockPower-r17  INTEGER (-60..50)                                                    OPTIONAL --Cond Pathloss
    tag-Id       Tag-Id
}

SSB-InfoNcell-r17  ::=  SEQUENCE {
    physicalCellId-r17      PhysCellId,
    ssb-IndexNcell-r17      SSB-Index,
    ssb-Configuration-r17   SSB-Configuration-r17                                                OPTIONAL --Need M
}
```

UPON RECEPTION OF A TIMING ADVANCE COMMAND FOR A TAG, THE UE ADJUSTS UPLINK TIMING FOR PUSCH/SRS/PUCCH TRANSMISSION ON ALL THE SERVING CELLS IN THE TAG BASED ON A VALUE $N_{TA,offset}$ THAT THE UE EXPECTS TO BE SAME FOR ALL THE SERVING CELLS IN THE TAG AND BASED ON THE RECEIVED TIMING ADVANCE COMMAND WHERE THE UPLINK TIMING FOR PUSCH/SRS/PUCCH TRANSMISSIONS IS THE SAME FOR ALL THE SERVING CELLS IN THE TAG

| | TRP0 | TRP1 | TRPs TIGHTLY-SYNCHED | TRPs WITH FAST BACKHAUL | S-DCI/M-DCI | R15/16 RACH WORKS? | # TAGs |
|---|---|---|---|---|---|---|---|
| SCENARIO 1 | CELL WITH SSB | TRP WITHOUT SSB | YES | YES | S | YES | 1 (OR 2 R17 TAGs) |
| SCENARIO 2 | CELL WITH SSB | TRP WITHOUT SSB | YES | YES | M | YES | 1 (OR 2 R17 TAGs) |
| SCENARIO 3 | CELL WITH SSB | TRP WITHOUT SSB | YES | NO | M | NO | 2 R17 TAGs (OR 1) |
| SCENARIO 4 | CELL WITH SSB | TRP WITHOUT SSB | NO | NO | M | NO | 2 R17 TAGs |
| SCENARIO 5 | CELL WITH SSB | CELL WITH SSB | YES | YES | S | YES | 2 R15/R17 TAGs |
| SCENARIO 6 | CELL WITH SSB | CELL WITH SSB | YES | YES | M | YES | 2 R15/R17 TAGs |
| SCENARIO 7 | CELL WITH SSB | CELL WITH SSB | YES | NO | M | YES | 2 R15/R17 TAGs |
| SCENARIO 8 | CELL WITH SSB | CELL WITH SSB | NO | NO | M | YES | 2 R15/R17 TAGs |

COVERS DUAL CONNECTIVITY

Figures 17, 18:
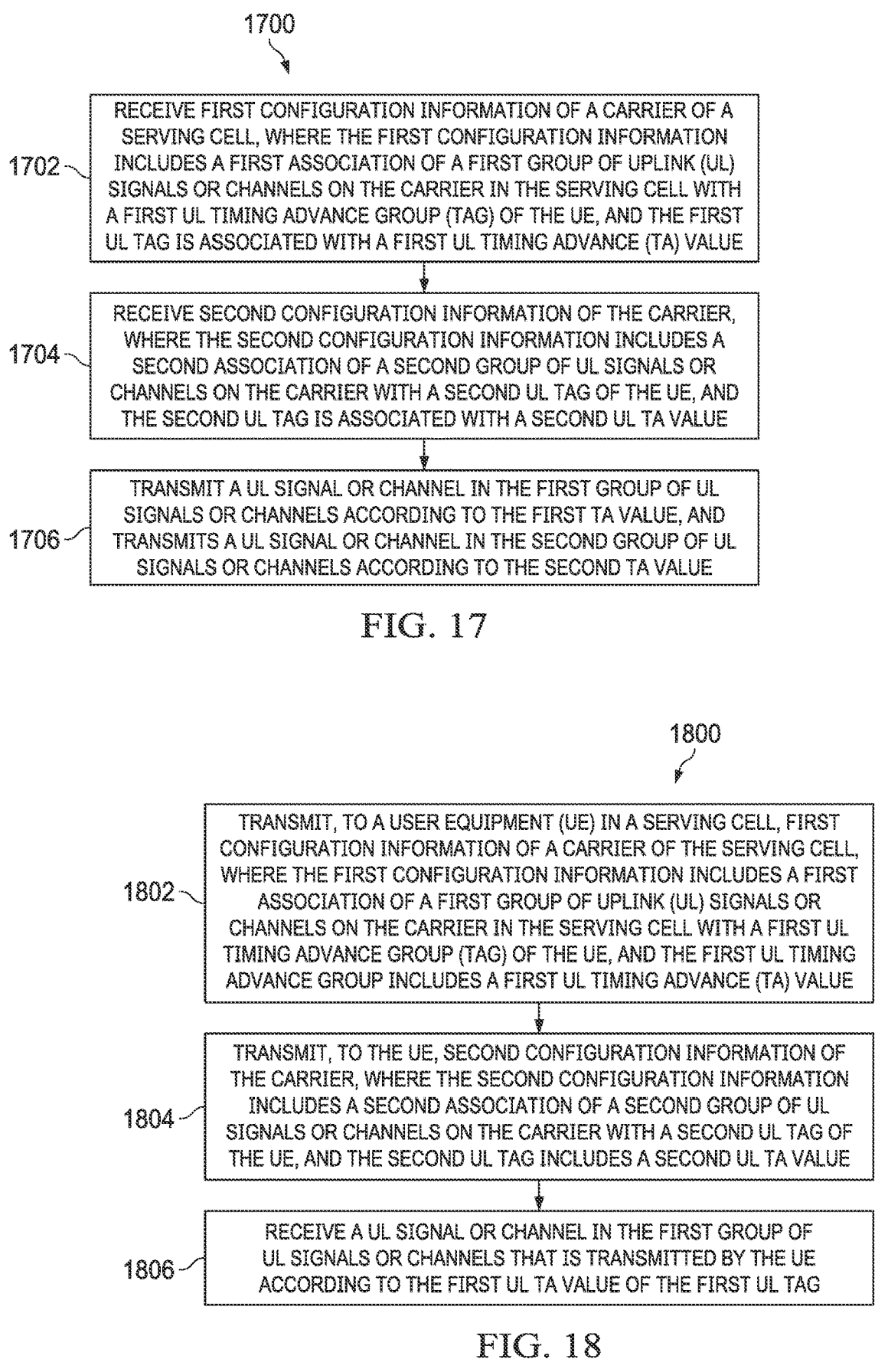

1702 — | RECEIVE FIRST CONFIGURATION INFORMATION OF A CARRIER OF A SERVING CELL, WHERE THE FIRST CONFIGURATION INFORMATION INCLUDES A FIRST ASSOCIATION OF A FIRST GROUP OF UPLINK (UL) SIGNALS OR CHANNELS ON THE CARRIER IN THE SERVING CELL WITH A FIRST UL TIMING ADVANCE GROUP (TAG) OF THE UE, AND THE FIRST UL TAG IS ASSOCIATED WITH A FIRST UL TIMING ADVANCE (TA) VALUE

1704 — | RECEIVE SECOND CONFIGURATION INFORMATION OF THE CARRIER, WHERE THE SECOND CONFIGURATION INFORMATION INCLUDES A SECOND ASSOCIATION OF A SECOND GROUP OF UL SIGNALS OR CHANNELS ON THE CARRIER WITH A SECOND UL TAG OF THE UE, AND THE SECOND UL TAG IS ASSOCIATED WITH A SECOND UL TA VALUE

1706 — | TRANSMIT A UL SIGNAL OR CHANNEL IN THE FIRST GROUP OF UL SIGNALS OR CHANNELS ACCORDING TO THE FIRST TA VALUE, AND TRANSMITS A UL SIGNAL OR CHANNEL IN THE SECOND GROUP OF UL SIGNALS OR CHANNELS ACCORDING TO THE SECOND TA VALUE

1802 — | TRANSMIT, TO A USER EQUIPMENT (UE) IN A SERVING CELL, FIRST CONFIGURATION INFORMATION OF A CARRIER OF THE SERVING CELL, WHERE THE FIRST CONFIGURATION INFORMATION INCLUDES A FIRST ASSOCIATION OF A FIRST GROUP OF UPLINK (UL) SIGNALS OR CHANNELS ON THE CARRIER IN THE SERVING CELL WITH A FIRST UL TIMING ADVANCE GROUP (TAG) OF THE UE, AND THE FIRST UL TIMING ADVANCE GROUP INCLUDES A FIRST UL TIMING ADVANCE (TA) VALUE

1804 — | TRANSMIT, TO THE UE, SECOND CONFIGURATION INFORMATION OF THE CARRIER, WHERE THE SECOND CONFIGURATION INFORMATION INCLUDES A SECOND ASSOCIATION OF A SECOND GROUP OF UL SIGNALS OR CHANNELS ON THE CARRIER WITH A SECOND UL TAG OF THE UE, AND THE SECOND UL TAG INCLUDES A SECOND UL TA VALUE

1806 — | RECEIVE A UL SIGNAL OR CHANNEL IN THE FIRST GROUP OF UL SIGNALS OR CHANNELS THAT IS TRANSMITTED BY THE UE ACCORDING TO THE FIRST UL TA VALUE OF THE FIRST UL TAG

TRANSMIT, TO A USER EQUIPMENT (UE) IN A SERVING CELL, FIRST CONFIGURATION INFORMATION OF A CARRIER OF THE SERVING CELL, WHERE THE FIRST CONFIGURATION INFORMATION INCLUDES A FIRST ASSOCIATION OF A FIRST GROUP OF UPLINK (UL) SIGNALS OR CHANNELS ON THE CARRIER IN THE SERVING CELL WITH A FIRST UL TIMING ADVANCE GROUP (TAG) OF THE UE, AND THE FIRST GROUP OF UL SIGNALS OR CHANNELS IS QCLed TO A CSI-RS FOR TRACKING (TRS) UNASSOCIATED WITH THE SERVING CELL, QCLed TO A FIRST SSB DIFFERENT THAN A SECOND SSB ASSOCIATED WITH THE SERVING CELL, OR QCLed TO A DOWNLINK/UPLINK REFERENCE SIGNAL THAT IS QCLed TO THE TRS OR THE FIRST SSB

1904

RECEIVE A UL SIGNAL OR CHANNEL IN THE FIRST GROUP OF UL SIGNALS OR CHANNELS THAT IS TRANSMITTED BY THE UE ACCORDING TO THE FIRST UL TA VALUE OF THE FIRST UL TAG

FIG. 19

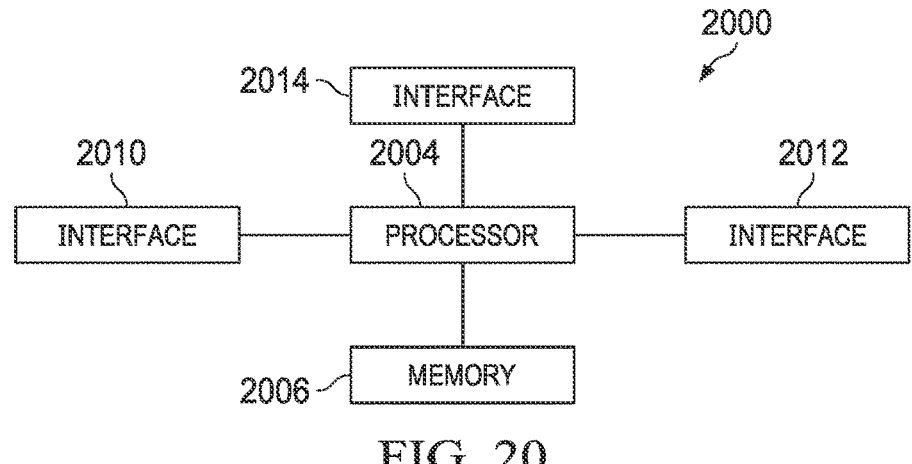

FIG. 20

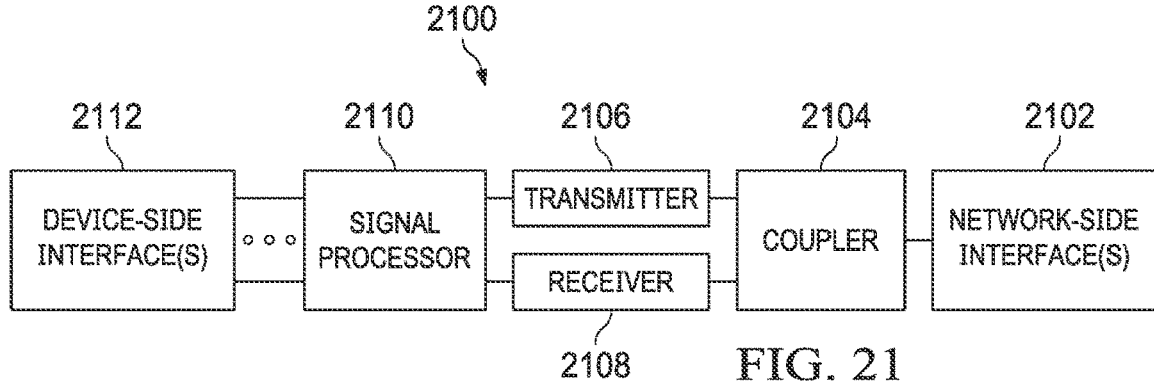

FIG. 21

SYSTEM AND METHOD FOR UPLINK TIMING IN MULTI-POINT COMMUNICATIONS

CROSS-REFERENCE TO RELATED APPLICATIONS

This application is a continuation of International Application No. PCT/US2020/045269, filed on Aug. 6, 2020, which application is hereby incorporated herein by reference.

TECHNICAL FIELD

The present disclosure relates generally to wireless communications, and, in particular embodiments, to a system and method for uplink timing in multi-point communications.

BACKGROUND

Wireless communication systems include long term evolution (LTE), LTE-A, LTE-A-beyond systems, 5G LTE, 5G New Radio (NR), etc. A modern wireless communication system may include a plurality of NodeBs (NBs), which may also be referred to as base stations, network nodes, communications controllers, cells or enhanced NBs (eNBs), and so on. A NodeB may include one or more network points or network nodes using different radio access technologies (RATs) such as high speed packet access (HSPA) NBs or WiFi access points. A NodeB may be associated with a single network point or multiple network points. A cell may include a single network point or multiple network points, and each network point may have a single antenna or multiple antennas. A network point may correspond to multiple cells operating in multiple component carriers. Generally each component carrier in carrier aggregation is a serving cell, either a primary cell (PCell) or a secondary cell (SCell).

A cell or NodeB may serve a number of users (also commonly referred to as User Equipment (UE), mobile stations, terminals, devices, and so forth) over a period of time. A communication channel from a base station to a UE is generally referred to as a downlink (DL) channel, and a transmission from the base station to the UE is a downlink transmission. A communication channel from a UE to a base station is generally referred to an uplink (UL) channel, and a transmission from the UE to the base station is an uplink transmission. The UE receives timing advance commands to adjust its uplink transmission timing to synchronize with the network for uplink transmission so that uplink transmissions from multiple UEs arrive at the base station at about the same time in a transmission time interval (TTI).

SUMMARY

In accordance with an embodiment of the present disclosure, a method for wireless communications is provided. The method includes: receiving, by a user equipment (UE), first configuration information of a carrier of a serving cell, the first configuration information including a first association of a first group of uplink (UL) signals or channels on the carrier in the serving cell with a first UL timing advance group (TAG) of the UE, the first UL TAG associated with a first UL timing advance (TA) value; receiving, by the UE, second configuration information of the carrier, the second configuration information including a second association of a second group of UL signals or channels on the carrier with a second UL TAG of the UE, the second UL TAG associated with a second UL TA value; and transmitting, by the UE, a UL signal or channel in the first group of UL signals or channels according to the first TA value, and transmitting, by the UE, a UL signal or channel in the second group of UL signals or channels according to the second TA value.

Optionally, in any of the preceding aspects, the serving cell is associated with a first physical cell identifier (PCID) and a first synchronization signal block (SSB) transmitted on the carrier or a different carrier, and a first UL signal or channel in the first group of UL signals or channels is quasi-co-located (QCLed) to the first SSB, or is QCLed to a downlink/uplink reference signal (RS) that is QCLed to the first SSB, or the first UL signal or channel in the first group of UL signals or channels is configured with pathloss RS that is QCLed to the first SSB.

Optionally, in any of the preceding aspects, a second UL signal or channel in the second group of UL signals or channels is QCLed to a second channel state information-reference signal (CSI-RS) for tracking (TRS) transmitted on the carrier or a different carrier, to a second SSB transmitted on the carrier or a different carrier associated with a neighbor cell that has a second PCID different than the first PCID or a PCID of any one of the UE's serving cells, or to a downlink/uplink reference signal that is QCLed to the second TRS or the second SSB, or the second UL signal or channel in the second group of UL signals or channels is configured with a pathloss RS that is QCLed to the second TRS or the second SSB.

Optionally, in any of the preceding aspects, the method further comprises: receiving, by the UE, a first physical downlink control channel (PDCCH), the first PDCCH being associated with a control resource set (CORESET) with a first CORESET pool index, and/or the first PDCCH having a demodulation reference signal (DMRS) that is QCLed to the first SSB and/or a first TRS QCLed to the first SSB.

Optionally, in any of the preceding aspects, the first PDCCH is a first PDCCH order requesting the UE to transmit a first random access preamble based on a first downlink (DL) RS QCLed to the first SSB, based on which the UE receives a TA command including a TA value for the first TAG, wherein the first DL RS is the first SSB or a first CSI-RS QCLed to the first SSB.

Optionally, in any of the preceding aspects, the first PDCCH is a second PDCCH order indicating the second TAG and requesting the UE to transmit a second random access preamble based on a second DL RS QCLed to the second TRS/SSB, based on which the UE receives a TA command including a TA value for the second TAG, the DL RS being the second SSB or a second CSI-RS QCLed to the second TRS/SSB.

Optionally, in any of the preceding aspects, the method further comprises: receiving, by the UE, a second PDCCH, the second PDCCH being associated with a CORESET with a second CORESET pool index, and/or the second PDCCH having a DMRS that is QCLed to the second SSB and/or the second TRS QCLed to the second TRS/SSB.

Optionally, in any of the preceding aspects, the second PDCCH is a third PDCCH order requesting the UE to transmit a third random access preamble based on a third DL RS QCLed to the second TRS/SSB, based on which the UE receives a TA command including a TA value for the second TAG, wherein the third DL RS is the second SSB or a third CSI-RS QCLed to the second TRS/SSB.

Optionally, in any of the preceding aspects, the first groups of UL signals or channels is transmitted using the first PCID as a scrambling ID or a first group of scrambling IDs pre-configured for the first group UL signal and channels; and the second groups of UL signals or channels is transmitted using a second group of scrambling IDs pre-configured for the second group UL signal and channels or using a second PCID associated with the second SSB as a scrambling ID.

Optionally, in any of the preceding aspects, each of the first UL TAG and the second UL TAG is associated with a TAG ID uniquely identifying a respective UL TAG.

Optionally, in any of the preceding aspects, the first and second groups of UL signals or channels are configured with a same subcarrier spacing (SCS) within a same bandwidth part (BWP).

In accordance with another embodiment of the present disclosure, a method for wireless communications is provided. The method includes transmitting, by a base station (BS) to a user equipment (UE) in a serving cell, first configuration information of a carrier of the serving cell, the first configuration information including a first association of a first group of uplink (UL) signals or channels on the carrier in the serving cell with a first UL timing advance group (TAG) of the UE, wherein the first UL timing advance group includes a first UL timing advance (TA) value; transmitting, by the BS to the UE, second configuration information of the carrier, the second configuration information including a second association of a second group of UL signals or channels on the carrier with a second UL TAG of the UE, wherein the second UL TAG includes a second UL TA value; and receiving, by the BS, a UL signal or channel in the first group of UL signals or channels that is transmitted by the UE according to the first UL TA value of the first UL TAG.

Optionally, in any of the preceding aspects, the serving cell is associated with a first primary cell identifier (PCID) and a first synchronization signal block (SSB), and the first group of UL signals or channels is quasi-co-located (QCLed) to the first SSB, or is QCLed to a downlink/uplink reference signal that is QCLed to the first SSB, or is configured with pathloss RS that is QCLed to the first SSB.

Optionally, in any of the preceding aspects, the second group of UL signals or channels is QCLed to a CSI-RS for tracking (TRS) unassociated with the serving cell, to a second SSB different than the first SSB, or to a downlink/uplink reference signal that is QCLed to the TRS or the second SSB, or is configured with a pathloss RS that is QCLed to the second TRS or the second SSB.

Optionally, in any of the preceding aspects, the method further comprises: transmitting, by BS to the UE, a first PDCCH associated with a CORESET with a first CORESET pool index, the first PDCCH having a demodulation reference signal (DMRS) that is QCLed to the first SSB or a TRS.

Optionally, in any of the preceding aspects, the first PDCCH is a first PDCCH order requesting the UE to transmit a first random access preamble based on a first DL RS QCLed to the first SSB, based on which the UE receives a TA command including a TA value for the first TAG, wherein the first DL RS is the first SSB or a first CSI-RS.

Optionally, in any of the preceding aspects, the first PDCCH is a second PDCCH order indicating the second TAG and requesting the UE to transmit a second random access preamble based on a second DL RS QCLed to the second TRS/SSB, based on which the UE receives a TA command including a TA value for the second TAG, the second DL RS being the second SSB or a second CSI-RS.

Optionally, in any of the preceding aspects, the first UL TAG is associated with a TAG ID uniquely identifying the first UL TAG.

In accordance with another embodiment of the present disclosure, a method for wireless communications is provided. The method includes: transmitting, by a base station (BS) to a user equipment (UE) in a serving cell, first configuration information of a carrier of the serving cell, the first configuration information including a first association of a first group of uplink (UL) signals or channels on the carrier in the serving cell with a first UL timing advance group (TAG) of the UE, wherein the first group of UL signals or channels is QCLed to a CSI-RS for tracking (TRS) unassociated with the serving cell, to a first SSB different than a second SSB associated with the serving cell, or to a downlink/uplink reference signal that is QCLed to the TRS or the first SSB; and receiving, by the BS, a UL signal or channel in the first group of UL signals or channels that is transmitted by the UE according to the first UL TA value of the first ULTAG.

Optionally, in any of the preceding aspects, the method further comprises: transmitting, by the BS to the UE, a PDCCH associated with a CORESET with a CORESET pool index, the PDCCH having a DMRS that is QCLed to the first SSB or the TRS.

Optionally, in any of the preceding aspects, the PDCCH is a PDCCH order requesting the UE to transmit a random access preamble based on a DL RS QCLed to the first TRS/SSB, based on which the UE receives a TA command including a TA value for the first TAG, wherein the DL RS is the first SSB or a CSI-RS.

Optionally, in any of the preceding aspects, the first UL TAG is associated with a TAG ID uniquely identifying the first UL TAG.

In accordance with another embodiment of the present disclosure, an apparatus is provided, which includes: a non-transitory memory storage including instructions; and one or more processors in communication with the memory storage, wherein the instructions, when executed by the one or more processors, cause the apparatus to perform any of the preceding aspects.

In accordance with another embodiment of the present disclosure, a system is provided. The system includes a user equipment (UE), configured to perform: receiving first configuration information of a carrier of a serving cell, the first configuration information including a first association of a first group of uplink (UL) signals or channels on the carrier in the serving cell with a first UL timing advance group (TAG) of the UE, the first UL TAG associated with a first UL timing advance (TA) value; receiving second configuration information of the carrier, the second configuration information including a second association of a second group of UL signals or channels on the carrier with a second UL TAG of the UE, the second UL TAG associated with a second UL TA value; and transmitting a UL signal or channel in the first group of UL signals or channels according to the first TA value, and transmitting a UL signal or channel in the second group of UL signals or channels according to the second TA value. The system further includes a base station (BS), configured to perform: transmitting the first configuration information to the UE; and receiving, from the UE, the UL signal or channel in the first group of UL signals or channels according to the first TA value.

Optionally, in any of the preceding aspects, the first BS is further configured to transmit the second configuration information to the UE.

Optionally, in any of the preceding aspects, the system further includes a second BS that is configured to perform: receiving, from the UE, the UL signal or channel in the second group of UL signals or channels according to the first TA value.

Optionally, in any of the preceding aspects, the second BS is further configured to transmit the second configuration information to the UE.

In accordance with another embodiment of the present disclosure, a system is provided. The system includes a user equipment (UE), that is configured to perform: receiving first configuration information of a carrier of a serving cell, the first configuration information including a first association of a first group of uplink (UL) signals or channels on the carrier in the serving cell with a first UL timing advance group (TAG) of the UE, the first UL TAG associated with a first UL timing advance (TA) value; receiving second configuration information of the carrier, the second configuration information including a second association of a second group of UL signals or channels on the carrier with a second UL TAG of the UE, the second UL TAG associated with a second UL TA value; and transmitting a UL signal or channel in the first group of UL signals or channels according to the first TA value, and transmitting a UL signal or channel in the second group of UL signals or channels according to the second TA value. The system further includes a base station (BS) that is configured to perform: transmitting the second configuration information to the UE; and receiving, from the UE, the UL signal or channel in the second group of UL signals or channels according to the second TA value.

Embodiments of the present disclosure enable different uplink transmissions of a UE over a carrier of a serving cell to be associated with different TAGs, and thus, timing of the different uplink transmissions may be adjusted differently. This enables improved uplink timing accuracy of the UE in multi-TRP (M-TRP) communications, and consequently improves the UE's physical uplink control channel (PUCCH)/physical uplink shared channel (PUSCH) reliability, spectrum efficiency, and sounding accuracy for uplink/downlink multi-input multi-output (MIMO) channel state information (CSI) acquisition.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 2 illustrates information elements (IEs) for configuring TAGs according to 3GPP TS 38.331;

FIG. 6 illustrates a table showing example groups of IDs configured for different TRPs;

FIG. 8 illustrates another embodiment TAG configuration;

FIG. 11 illustrates a table showing embodiment M-TRP scenarios for RACH and observation as a result of analysis of the scenarios;

FIG. 17 illustrates a flowchart of an embodiment method for wireless communications;

FIG. 18 illustrates a flowchart of another embodiment method for wireless communications;

FIG. 19 illustrates a flowchart of another embodiment method for wireless communications;

FIG. 20 illustrates a block diagram of an embodiment processing system; and

FIG. 21 illustrates a block diagram of an embodiment transceiver.

DETAILED DESCRIPTION OF ILLUSTRATIVE EMBODIMENTS

In multiple-TRP communications, a UE, in a serving cell associated with a TAG of a carrier or a bandwidth part (BWP, which may be seen as a portion of the carrier that the UE is currently operating on for the carrier), adjusts its uplink transmission timing for multiple TRPs (M-TRP) over the carrier or BWP using the same TA of the TAG associated with the serving cell. This may cause inaccurate uplink timing of the UE in communication with a TRP not configured as a serving cell of the UE, e.g., when the TRP is not synchronized with the serving cell, when the TRP and the serving cell have a non-ideal backhaul, and/or when the TRP is located far away from the serving cell, and a difference of propagation delays of the UE with the TRP and with the serving cell cannot be neglected in adjusting uplink timing of the UE. The inaccurate uplink timing may negatively affect the UE's physical uplink control channel (PUCCH)/physical uplink shared channel (PUSCH) reliability, spectrum efficiency, and sounding accuracy for uplink/downlink multi-input multi-output (MIMO) channel state information (CSI) acquisition. It would be desirous to configure separate TAGs for the serving cells and the TRP.

Embodiments of the present disclosure provide methods for M-TRP communications of a UE in a serving cell over a carrier/BWP of the serving cell, with separate TAGs configured for different TRPs in the M-TRP communications. The embodiment methods improve uplink timing accuracy of the UE in the M-TRP communications. Embodiments of the present disclosure also provide methods for configuring the TRPs with separate TAGs, and acquiring/obtaining TAs of the separate TAGs by the UE. Details will be provided in the following.

Figure 1:
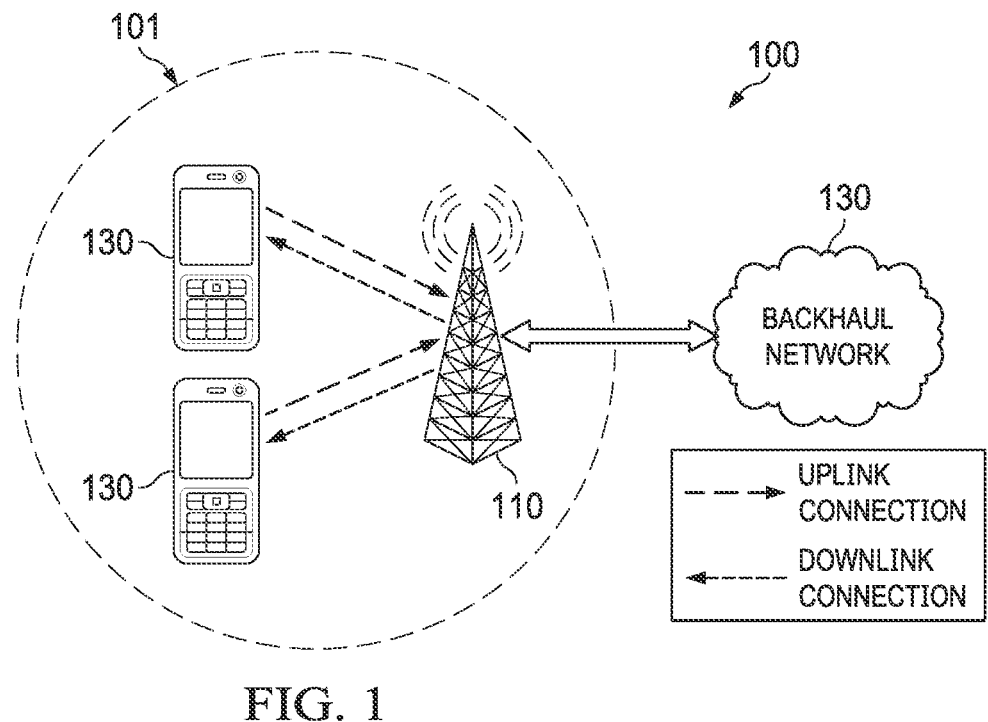
FIG. 1 illustrates a diagram of an embodiment wireless communication system.

FIG. 1 illustrates an example wireless communication system boo. Communication system 100 includes a base station 110 with coverage area 101. The base station 110 serves a plurality of user equipments (UEs), including UEs 120. Transmissions from the base station 110 to a UE is referred to as a downlink (DL) transmission and occurs over a downlink channel (shown in FIG. 1 as a solid arrowed line), while transmissions from a UE to the base station 110 is referred to as an uplink (UL) transmission and occurs over an uplink channel (shown in FIG. 1 as a dashed arrowed line). Data carried over the uplink/downlink connections may include data communicated between the UEs 120, as well as data communicated to/from a remote-end (not shown) by way of a backhaul network 130. Example uplink channels and signals include physical uplink shared channel (PUSCH), physical uplink control channel (PUCCH), an uplink sounding reference signal (SRS), or physical random access channel (PRACH). Services may be provided to the plurality of UEs by service providers connected to the base station 110 through the backhaul network 130, such as the Internet. The wireless communication system 100 may include multiple distributed access nodes 110.

In a typical communication system, there are several operating modes. In a cellular operating mode, communications to and from the plurality of UEs go through the base station 110, while in device to device communications mode, such as proximity services (ProSe) operating mode, for example, direct communication between UEs is possible. As used herein, the term "base station" refers to any component (or collection of components) configured to provide wireless access to a network. Base stations may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, access nodes, access points, transmission points (TPs), transmission-reception points (TRPs), cells, carriers, macro cells, femtocells, pico cells, relays, customer premises equipment (CPE), the network side, the network, and so on. In the present disclosure, the terms "base station" and "TRP" are used interchangeably unless otherwise specified. As used herein, the term "UE" refers to any component (or collection of components) capable of establishing a wireless connection with a base station. UEs may also be commonly referred to as mobile stations, mobile devices, mobiles, terminals, user terminals, users, subscribers, stations, communication devices, CPEs, relays, Integrated Access and Backhaul (IAB) relays, and the like. It is noted that when relaying is used (based on relays, picos, CPEs, and so on), especially multi-hop relaying, the boundary between a controller and a node controlled by the controller may become blurry, and a dual node (e.g., either the controller or the node controlled by the controller) deployment where a first node that provides configuration or control information to a second node is considered to be the controller. Likewise, the concept of UL and DL transmissions can be extended as well.

A cell may include one or more bandwidth pails (BWPs) for UL or DL allocated for a UE. Each BWP may have its own BWP-specific numerology and configuration, such as the BWP's bandwidth. It is noted that not all BWPs need to be active at the same time for the UE. A cell may correspond to one carrier, and in some cases, multiple carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary UL (non-SUL, or simply UL) carrier which has an associated DL, and other carriers are called supplementary UL (SUL) carriers which do not have an associated DL. A cell, or a carrier, may be configured with slot or subframe formats comprised of DL and UL symbols, and that cell or carrier is seen as operating in a time division duplexed (TDD) mode. In general, for unpaired spectrum, the cells or carriers are in TDD mode, and for paired spectrum, the cells or carrier are in a frequency division duplexed (FDD) mode. A transmission time interval (TTI) generally corresponds to a subframe (in LTE) or a slot (in NR). Access nodes may provide wireless access in accordance with one or more wireless communication protocols, e.g., long term evolution (LTE), LTE advanced (LTE-A), 5G, 5G LTE, 5G NR, future 5G NR releases, 6G, High Speed Packet Access (HSPA), Wi-Fi 802.11a/b/g/n/ac, etc. While it is understood that communication systems may employ multiple access nodes (or base stations) capable of communicating with a number of UEs, only one access node, and two UEs are illustrated in FIG. 1 for simplicity.

Uplink timing may be controlled through timing advance (TA). TA is generally used to compensate for the propagation delay as signal travels between UEs and their serving network nodes, e.g., TRPs. Uplink timing of a UE may be measured by a TRP using an uplink signal or channel, e.g., PUSCH, PUCCH, PRACH or SRS, transmitted by the UE. A TA value may be determined and assigned to the UE based on the measurement. Timing advance commands may be transmitted, e.g., periodically, by the TRP, generally in a medium access control (MAC) command entity (CE). A timing advance command may include a TA value, based on which the UE adjusts its uplink transmission timing to align with the timing at the network side. With proper TA values applied to UL transmissions from UEs in a cell, the UL transmissions of the UEs arrive at the base station at about the same time to facilitate detection and/or decoding of the UL transmissions from the multiple UEs, For example, when a UE wishes to establish radio resource control (RRC) connection with a TRP, it transmits a random access (RA) preamble over a random access channel (RACH) to the TRP. The TRP estimates the UL transmission timing of the UE based on reception of the random access preamble, and transmits a random access response (RAR) to the UE in response to receiving the random access preamble. The RAR may include a timing advance command that includes a TA value. The UE may use the TA as an initial TA with the TRP, and perform uplink transmission according to a timing adjusted based on the initial TA. The TRP may periodically transmit a TA command to the UE 302 for the UE 302 to update its TA value, e.g., due to the change of the distance between the UE and the TRP. A UE with the capability of multiple timing advances for carrier aggregation may simultaneously receive and/or transmit on multiple component carriers (CCs) corresponding to different timing advances.

Cells are grouped into different timing advance groups (TAGs). Cells having an uplink to which the same TA applies (e.g., cells hosted by the same transceiver) and using the same timing reference cell may be grouped in one TAG. Thus, cells grouped in the same TAG have the same TA. A cell may be assigned to a TAG via radio resource control (RRC) signaling. Thus, a cell is associated with a TAG. Each TAG may update its corresponding TA periodically. When receiving a TA command of a cell associate with a TAG, a UE adjusts its uplink transmission timing, e.g., for transmission of PUCCH, PUSCH, and/or SRS of the cell based on the received TA command of the associated TAG.

In 3GPP 5G NR Release 15 and 16 (R15/16), TAGs are cell based. In one carrier, there is only one serving cell, which is assigned with one TAG. In 3GPP R16, for M-TRP communications, a TRP not configured as a serving cell (e.g., the TRP1 314) is configured with the same TAG of its co-channel cell (e.g., the TRP0 312). FIG. 2 illustrates information elements (IEs) for configuring TAGs according to 3GPP TS 38.331 for 3GPP R15/16 as of July 2020. Each serving cell (PCell and/or SCell) is configured, in its IE ServingCellConfig, with a field tag-Id, which uniquely identifies a TAG. For all serving cells configured with the same tag-Id, they belong to the same TAG. The current framework of TA/TAG allows only a serving cell to be configured with a TA/TAG. In one carrier, there can be only one serving cell, and that cell is assigned with one TAG. With Rel-16 M-TRP design, for a TRP not co-located with a serving cell, Rel-16 does not have a separate TA for it and the UE applies the TA of the co-channel serving cell for this TRP. This works fine even for M-TRP scenarios provided that the multiple TRPs are not located far away from one another, are connected by fast backhaul, and are tightly synchronized. However, this has limited applications/deployment scenarios and needs to be enhanced.

When a UE is served by multiple TRPs in a serving cell associated with a TAG in a BWP over a carrier, the UE's uplink transmission timing for all the multiple TRPs in the BWP over the carrier is adjusted using the same TA of the TAG associated with the serving cell. Note that the multiple TRPs over the same carrier operate on the same BWP as specified in Rel-16. Using the same TA of a serving cell for communication with different TRPs may, in some cases, cause inaccurate uplink timing (uplink TA). This may negatively affect the UE's PUCCH/PUSCH reliability, spectrum efficiency, and sounding accuracy for uplink/downlink full multi-input multi-output (MIMO) channel state information (CSI) acquisition. Cyclic prefix (CP) may not be sufficient to cover the propagation delay differences, delay spread, and M-TRP sync inaccuracy.

Figure 3:
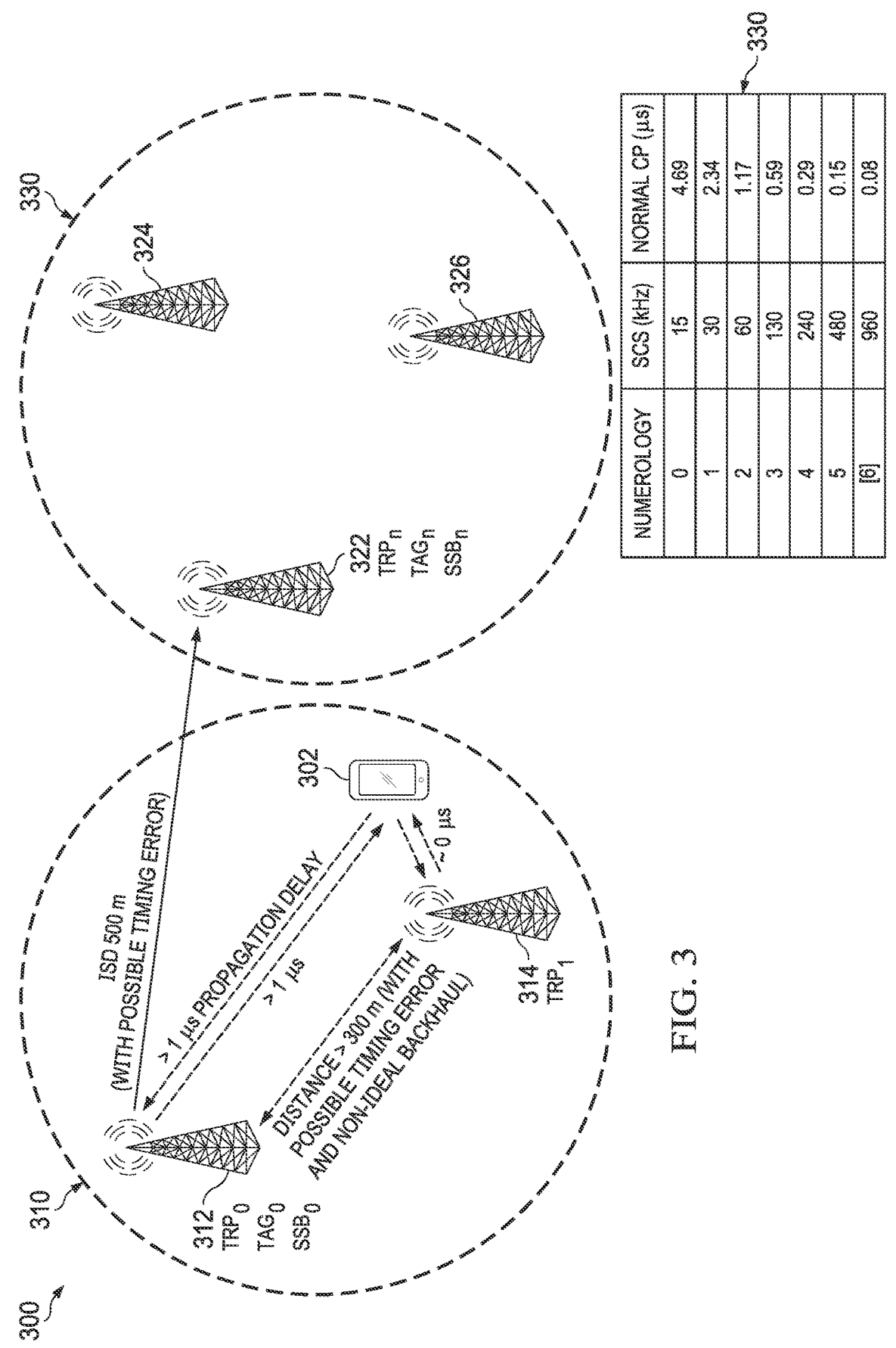
FIG. 3 illustrates a diagram of an embodiment wireless network.

FIG. 3 illustrates a diagram of an embodiment wireless network 300, highlighting a scenario causing inaccurate uplink TA. As shown, the wireless network 300 includes a serving cell 310 (or base station) of a UE 302 serving the UE 302 over a carrier. A TRP0 312 operating on a BWP over the carrier is co-located with the base station or cell 310, and broadcasts a PCID/SSB for the cell 310. The TRP0 312 transmits the SSB generated based on the PCID of the cell 310, and thus the PCID is transmitted/broadcast via transmission of the SSB. This is simplified as a TRP transmitting (or broadcasting) PCID/SSB in the following descriptions of the present disclosure for illustrative convenience. The SSB generated based on the PCID of the cell 310 is deemed to be associated with the cell 310 (or the PCID) or to be of the cell 310. A signal unassociated with the cell 310 indicates that the signal is not associated with the PCID of the cell, or not associated with a signal of the cell 310, directly or indirectly. The TRP0 312 may be configured to operate over one or more carriers/BWPs. The TRP0 312 may be referred to as a co-located TRP of the cell 310. A TRP1 314 is located in the coverage area of the serving cell 310 (with a certain distance from the TRP0 312) and configured to cooperate with the TRP0 312 to serve UEs in the serving cell 310 over the carrier, i.e., providing multi-TRP (m-TRP, or M-TRP) communications over the carrier. The TRP1 314 is within the coverage range of the serving cell 310, assisting the serving cell 310, and not broadcasting the PCID/SSB for the cell 310, and may rely on the serving cell 310 for some functionalities (e.g., control plane functionalities), and thus it is considered as an intra-cell TRP of the cell 310. The TRP1 314 may be referred to as an intra-cell TRP of the cell 310 and co-channeled (i.e., serving over the same carrier) with the TRP0 312. The TRP1 314 may not be co-located with the cell 310 and does not broadcast any PCID or SSB. The TRP1 314 may not be co-located with the TRP0 312. However, in some deployment, e.g., at frequency range 2 (FR2), the TRP1 314 may also broadcast the same PCID as the TRP0 312 does, and transmit a SSB as a reference for timing/beam (e.g., the SSB can be used by a UE for timing synchronization and initial beam acquisition for communication with the TRP1 314) but on a different SSB resource than the SSB transmitted by the TRP0 312. The wireless network 300 also includes a TRPn 322 associated with a cell 320, which may be a neighbor cell of the serving cell 310. As a neighbor cell instead of a serving cell, the TRPn 322 generally does not serve UEs that are served by the cell 310, but may cause interference to the UEs served by cell 310, and it is not configured as a serving cell for the UEs served by the cell 310. This is different from a serving cell transmitting RRC/MAC/PHY layer signals to a UE and maintaining a connection to the UE. TRPs 324, 326 are located in the coverage area of the cell 320 and configured to cooperate with the TRPn 322 to serve UEs of the cell 320 over one or more carriers supported by the TRPn 322. The UE 302 may be served by both the TRP0 312 and TRP1 314 over the same carrier, or over different carriers. Each of the cells 310 and 320 has an associated physical cell identifier (PCID, or PCI) and a synchronization signal block (SSB), based on which UEs synchronize with the respective cell.

As used herein, a TRP being co-located with another TRP (or base station, or cell) indicates that the two TRPs are at the same location and share the same set of antennas, and may, in some cases, even share the same antenna configuration (e.g., the same analog antenna beamforming). A co-located relation between two TRPs may be known to the network side but not be revealed to a UE, i.e., transparent to the UE. In some cases, it may be useful for the UE to know whether two received signals are from the same transmitter (or TRP, or antenna) or not, and QCL assumptions between RS ports of the transmitters may be introduced and signaled to the UE. A TRP being co-channeled with another TRP (or base station, or cell) indicates that they operate on the same carrier in frequency. A standalone TRP transmits a SSB/PCID of a cell (the signal on the SSB is generated based on the PCID), and thus a UE can find it during a cell search/initial access procedure. The UE connects to the standalone TRP/cell after that. A non-standalone TRP does not transmit a SSB/PCID, and thus a UE cannot find it during a cell search/initial access procedure. The UE cannot connect to the non-standalone TRP directly. The UE first connects to a standalone TRP/cell, and then the standalone TRP/cell signals the UE with information about the non-standalone TRP, so that the UE may communicate with the non-standalone TRP.

In this example, the cell 310 is assigned to TAG1 associated with the carrier. The UE 302 may have established a connection with the cell 310 through a random access procedure, and receives a TA command of the TAG1 from the TRP0 312. The TA value in the TA command is generally related to the distance between the TRP0 312 and the UE 302. The UE 302 then transmits uplink signals/channels over the carrier to both the TRP0 312 and TRP1 314 according the TA command, i.e., the same TA value, if they are in the same TAG as in Rel-16, i.e., if they are configured with the same TAG according to Rel-16. However, in a case where the two TRP0 312 and TRP1 314 are located far away from each other, e.g., with a distance greater than 300 m, with non-ideal backhaul (e.g., with a backhaul latency of 10-20 ms or even longer, which may cause them not tightly synchronized with each other) between the TRPs 312, 314, and the UE 302 is closer to the TRP1 314 (e.g., with nearly no propagation delay) than to the TRP0 312 (e.g., with a greater than it's propagation delay), uplink timing error may occur when the UE 302 communicates with the TRP1 314 using the TA value of the TAG1, which is assigned based on the TRP0 312. This is because that the TA of the TAG1 is not well suited for TRP1 314 in view of the distance between the TRP1 314 and the TRP0 312, between the TRP1 314 and the UE 302, and between the TRP0 312 and the UE 302. In this case, there is a large propagation delay difference between the TRP1 314 and the UE 302, and between the TRP0 312 and the UE 302. Cyclic prefix (CP) may help mitigate the propagation delay difference to some extent, however, for higher subcarrier spacing (SCS), e.g., greater than 15 kHz, CP is short as shown in the table 330 in FIG. 3 and may not be sufficient to absorb such a large propagation delay difference, resulting in poor uplink timing alignment of the UE 302 with respect to the TRP1 314. Thus, it would be desirous to configure a separate TA value and hence a separate TAG for the UE 302 to communicate with the TRP1 314, although TRP0 312 and TRP1 314 are co-channeled in the same carrier of the serving cell 310 of the UE 302. That is, the TRP0 312 and the TRP1 314 may be associated with different TAGs, so that the UE 302 adjusts its uplink transmission timing differently for communications with the TRP0 312 and the TRP1 314, respectively. The UE 302 may need to perform a random access procedure to acquire the TA of a TAG associated with the TRP1 314 and synchronize with the TRP1 314 that does not have a standalone PCID, especially for SCS greater than 15 kHz. By doing so, more TRPs, especially TRPs far from the each other, can be added to the serving TRP pool for the UE 302 and well utilized by the UE 302.

In some cases, the network may also configure the TRPn 322 to serve the UE 302 over the same carrier, without configuring it as a secondary cell (SCell) of the UE 302, e.g., in order to provide increased network capacity. The TRPn 322 is an inter-cell TRP, as opposed to an intra-cell TRP; however, it may be transparent to the UE. In this case, with Rel-16 design, the UE 302 may still use the TA of the TAG1 for uplink transmission to the TRPn 322. However, if the TRPn 322 is located far away from the TRP0 312, e.g., greater than 500 meters, and/or if the timing of the TRPn 322 is not tightly synchronized to the TRP0 312, uplink timing error occurs because the TA of the TAG1 is not well suited for TRPn 322 in view of the distance/timing differences between the TRPn 322 and the TRP0 312, and between the TRPn 322 and the UE 302. It would also be desirous to configure a separate TAG for the UE 302 to communicate with the TRPn 322 over the carrier. By doing so, more TRPs, including inter-cell TRPs, can be added to the serving TRP pool for the UE 302 and well utilized by the UE 302.

Embodiments of the present disclosure provide methods for M-TRP communications of a UE in a serving cell over the same carrier/BWP of the serving cell, with separate TAGs configured for multiple TRPs in the M-TRP communications. The embodiment methods provide a solution to the problem discussed above with respect to FIG. 3, which improves uplink timing accuracy of the UE in the M-TRP communications. The embodiment methods may be applied to intra-cell M-TRP communications, inter-cell M-TRP communications, or a mix of intra-cell and inter-cell M-TRP communications. In the intra-cell M-TRP communications, al of the multiple TRPs are located within the coverage area of the current serving cell of the UE. Such a TRP of the multiple TRPs may be referred to as a co-cell (or intra-cell) TRP of the serving cell in the disclosure for illustrative convenience, e.g., TRP1 314, and if it also serves the UE by transmitting/receiving data with the UE, it may be called as an intra-cell serving TRP or simply intra-cell TRP of the UE. In the inter-cell M-TRP communications, one or more TRPs may be from another cell different from the serving cell of the UE, and are referred to as inter-cell serving TRPs (or simply inter-cell TRPs) in the disclosure for illustrative convenience. A TRP acting as the serving cell of the UE and broadcasting a PCID/SSB of the serving cell may be referred to as the serving cell of the UE in the disclosure for illustrative convenience, e.g., TRP0 312 broadcasting SSB0 of the cell 310 may be referred to as the "cell", "serving cell", or "base station" for the UE 302. The TRP is thus associated with the serving cell of the UE. Using FIG. 3 as an example, the TRPs that serve the UE 302 may be referred to as serving TRPs of the UE 302, and the TRPs may be intra-cell (e.g., TRP1 314) and/or inter-cell (e.g., TRPn 322), co-located with the cell (e.g., TRP0 312), or non-co-located with the cell (e.g., TRP1 314, and TRPn 322). The intra-cell TRP1 314 may or may not broadcast the PCID/SSB of the serving cell of the UE, but in some deployment, e.g., at FR2, the TRP1 314 may also broadcast the same PCID as the TRP0 312 does, and transmit SSB as a reference for timing/beam but on a different SSB resource than the TRP0 312. The inter-cell TRPn 322 may or may not broadcast a PCID/SSB of a cell, where the inter-cell TRPn 322 is located in a coverage area of the cell. Each TRP may have one or more carriers. For M-TRP scenarios, a UE may also operate with carrier aggregation, i.e., it communicates over multiple carriers with the TRP0 312, and on each of these carriers, the UE may also be served by one or more intra-cell TRPs, such as the TRP1 314 and/or inter-cell TRPs, such as the TRPn 322. That is, the UE may also communicate with those TRPs on multiple carriers.

In some embodiments, in one carrier, there is one serving cell, but there are multiple TAGs, SSBs, and/or PCIDs configured for a UE. A serving TRP of the UE, e.g., TRP0 312, may be associated with a TAG (or a co-channel TAG, TAG0), e.g., using RRC signaling as conventionally configured, if it is associated with the serving cell 310 of the UE, as discussed above. An intra-cell or inter-cell serving TRP not configured as a serving cell or not co-located with a serving cell of the UE, e.g., TRP1 314, or TRPn 322, may be associated with a separate TAG. For a serving TRP not transmitting a SSB, e.g., the TRP1 314, a tracking reference signal (TRS), also referred to as a channel state information-reference signal (CSI-RS) for tracking, of such a serving TRP may be used to form a separate TAG, e.g., a R17 TAG, even when there is already a co-channel TAG associated with the serving cell, e.g., the cell 310. Uplink signals of the UE that is quasi-co-located (QCLed) to the TRS are associated with the separate TAG. Thus, the TRS may be used to form the separate TAG. The TRP0 312 may operate on more than one carrier, and the carriers not far away from each other in the frequency domain may belong to the same TAG, i.e., TAG0. TRP1 314 may also operate on more than one carrier, each of which is co-channelled with one carrier on the TRP0 312, and each of which has a TRS transmitted; all uplink signals of the UE that is quasi co-located (QCLed) to these TRSs of the TRP1 314 are associated with the separate TAG. In general, TRSs transmitted from the same/co-located TRP on a same frequency band can be used to define a TAG, and TRSs transmitted from non-co-located TRPs may be associated with different TAGs. A random access procedure may be performed by the UE with the serving TRP to obtain information about the separate TAG and the TA associated with the separate TAG, and as a result, TRP/TRS-specific scrambling ID(s) may be needed for PUSCH and for demodulation reference signal (DMRS) of PUSCH communicated during the random access procedure, as well as TRP/TRS-specific scrambling ID(s) for DMRS of PDSCH, TRP/TRS-specific scrambling ID(s) for physical downlink shared channel (PDSCH), TRP/TRS-specific scrambling ID(s) for DMRS of physical downlink control channel (PDCCH), and TRP/TRS-specific scrambling ID(s) for PDCCH.

The quasi co-location (QCL) types corresponding to each DL RS (more specifically, the port(s) or antenna port(s) of the DL RS) are given by the higher layer parameter qcl-Type in QCL-Info and may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. The QCL types may be configured/indicated in transmission configuration indication (TCI) states for a RS. The QCL assumptions are mainly used for DL RS, but can be generalized for UL RS if the association via pathloss RS and spatial relation are specified. The QCL assumption may be specified as: {RS1: QCL Type C to RS2}, {RS1: QCL Type C to RS2 and QCL Type D to RS3}. Then RS1 (destination RS) derives the properties specified according to the QCL types from the associated (i.e., source) RSs (e.g., RS2). Note that the source RS may be a SSB. Note also that the source RS and destination RS may be on the same carrier or different carriers (i.e., cross-carrier QCL).

For an inter-cell serving TRP, e.g., TRPn 322, a SSB of the inter-cell serving TRP may be configured to the UE but not as a SCell of the UE (i.e., the cell associated with the SSB of the inter-cell serving TRP is not one of the serving cells of the UE). A TRS of the inter-cell serving TRP may be used to form a separate TAG, even when there is already a co-channel TAG associated with the serving cell, e.g., the cell 310. A random access procedure may be performed by the UE with the inter-cell serving TRP to obtain information about the separate TAG, and as a result, TRP-specific scrambling ID(s) may be needed for PUSCH and for DMRS of PUSCH communicated during the random access procedure, as well as TRP/TRS-specific scrambling ID(s) for DMRS of PDSCH, TRP/TRS-specific scrambling ID(s) for PDSCH, TRP/TRS-specific scrambling ID(s) for DMRS of PDCCH, and TRP/TRS-specific scrambling ID(s) for PDCCH.

A PDCCH order (or command) may be used to indicate, via a ID or quasi co-location (QCL) relation and/or a default relation, which serving TRP, e.g., the TRP1 314 or the TRPn 322, that a UE needs to perform a random access with, and triggers the UE to initiate a random access procedure to obtain information of a TAG and TA of a corresponding TRP. Each TRP may be associated with an ID, such as a control resource set (CORESET) pool ID, so that, for example, a PDCCH order received on a CORESET with a CORESET pool ID 0 indicates a PRACH transmission to a TRP associated with the ID 0. In another example, a PDCCH order received with a QCL relation/TCI state linking to a SSB or a TRS indicates a PRACH transmission to a TRP associated with that SSB or TRS.

Taking FIG. 3 as an example, the UE 302 may be synchronized with the TRP0 312 that is the serving cell 310 of the UE 302 over a carrier, and receives a TA command of a first TAG, i.e., TAG1, that includes the serving cell 310. Thus, the UE 302 is configured with TAG1 for communication with the TRP0 312. A PDCCH order may be transmitted, by the TRP0 312 or the TRP1 314, to the UE 302, including information about random access parameters and triggering/instructing the UE 302 to perform a random access procedure with the TRP1 314, when the base station for the serving cell 310 decides to connect the UE with TRP1 314, or when the base station for the serving cell 310 finds that the TA to the TRP1 314 is lost or inaccurate. The UE 302 may then transmit a RACH preamble to the TRP1 314, and receive, e.g., in a random access response (RAR), a TA command of a second TAG, e.g., TAG2, which is associated with the carrier and includes the TRP1 314. Thus, the UE 302 is configured with TAG 2 for communication with the TRP1 314. A PDCCH order may also be transmitted, by the TRP0 312 or the TRPn 322, to the UE 302, triggering the UE 302 to perform a random access procedure with the TRPn 322. The UE 302 may transmit a RACH preamble to the TRPn 322, and receive a TA command of a third TAG, e.g., TAG3, which is associated with the carrier and includes the TRPn 322. Thus, the UE 302 is configured with TAG 3 for communication with the TRPn 322. Each of the TAGs is associated with a TAG ID uniquely identifying a respective TAG. After receipt of the TAs of the different TAGs, i.e., TAG1, TAG2 and TAG3, the UE 302 may perform uplink transmission over the carrier with the TRP0 312, TRP1 314 and TRPn 322 according to uplink transmission timing adjusted based on their respective TAs. A TA of an associated TAG may be updated periodically, e.g., about every 20 to 50 ms, for each TAG, and the updated TA may then be sent to the UE 302 in a TA command. The TA command may be carried in an MAC CE. The TA may be updated by the network by measuring an uplink transmission from the UE 302, e.g., SRS. The UE 302 may adjust its uplink transmission timing for a TAG according to the updated TA of the TAG. The UE 302 may thus be served by two or more of the TRP0 312, TRP1 314 and TRPn 322 over the carrier, with each of the TRP0 312, TRP1 314 and TRPn 322 associated with a separate TAG. The separate TAG enables the UE 302 to more accurately adjust its uplink transmission timing with a TRP of the separate TAG.

Figure 7A:
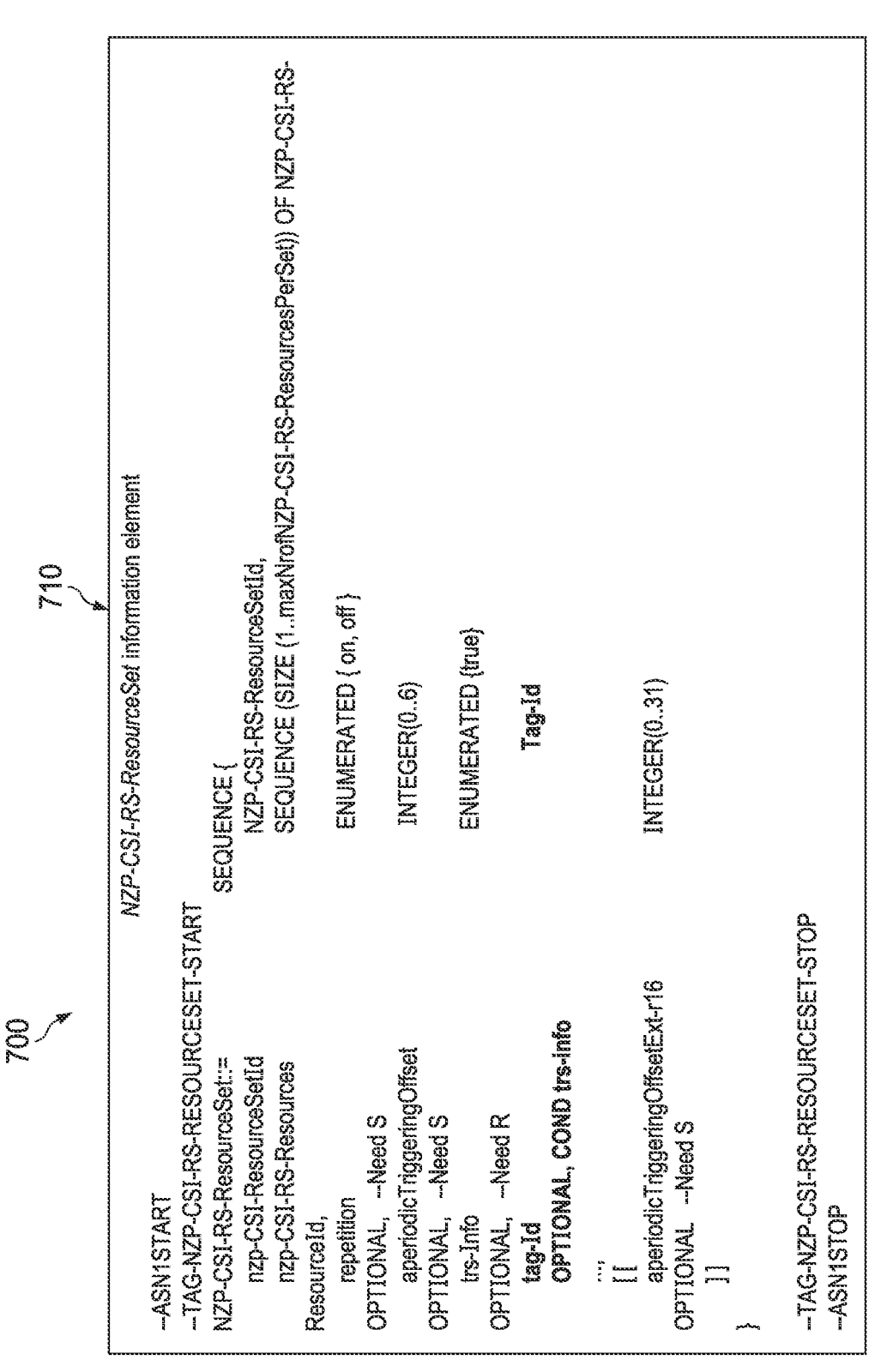
FIGS. 7A and 7B illustrate embodiment TAG configurations.
Figure 7B:
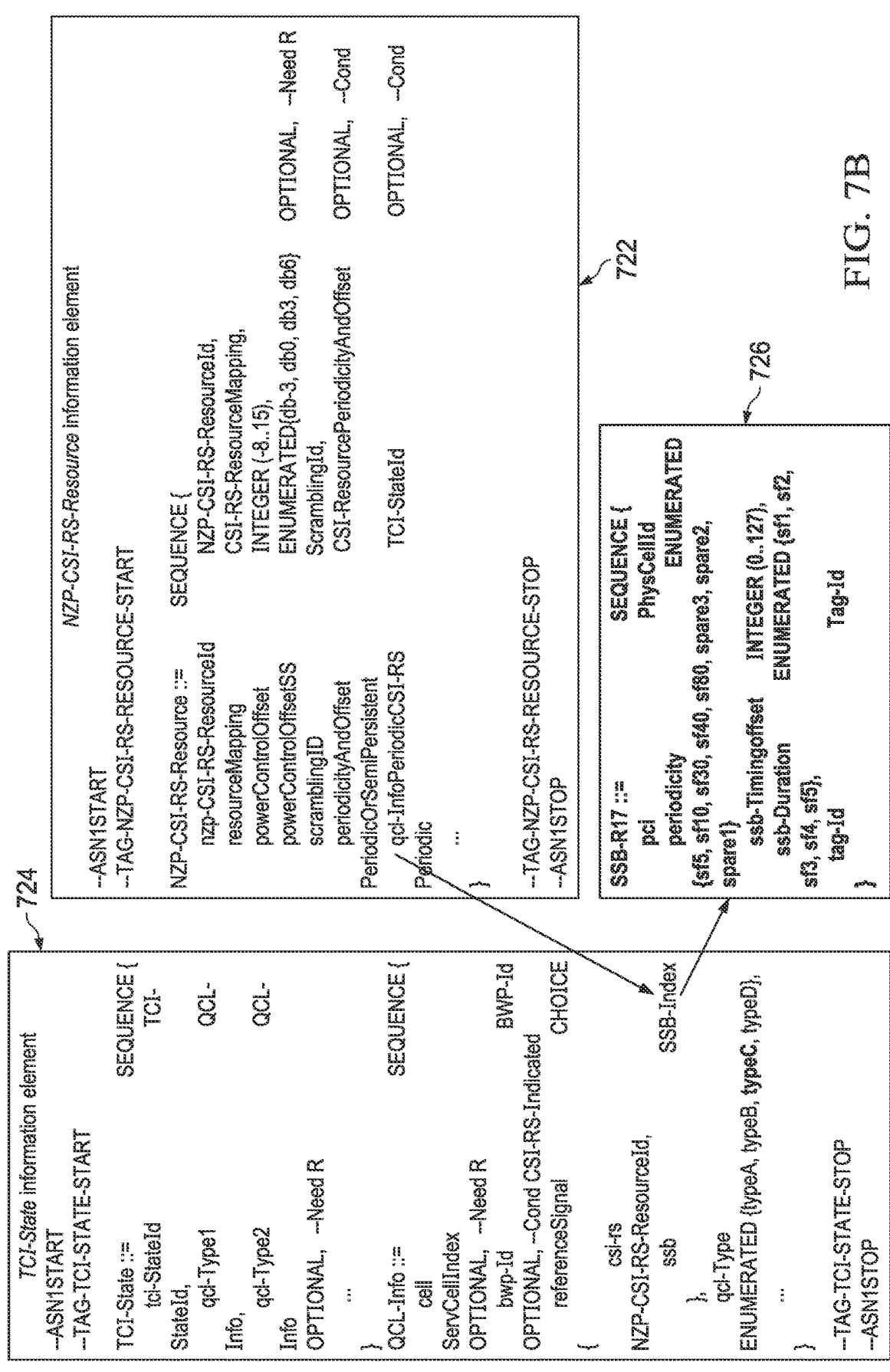

The UE 302 may receive scheduling information scheduling uplink transmission of the UE with a TRP on a carrier according to a TAG associated with the TRP. In some embodiments, the UE 302 may receive first configuration information of the carrier of the serving cell 310 via a RRC configuration signaling. FIGS. 7A and 7B illustrate embodiment configuration information that may be sent to the UE, indicating an association of a TAG with an uplink transmission by the UE. The first configuration information may include/indicate an association between a first group of uplink signals and channels to be transmitted on the carrier by the UE in the serving cell 310 and the uplink TAG1, and the TAG1 is associated with a first TA value. That is, the first configuration information of the carrier indicates that transmission of the first group of uplink signals and channels by the UE is according to the first TA value of the TAG1. The first configuration information may be transmitted by the TRP0 312 to the UE 302. The UE 302 may also receive second configuration information of the carrier, which includes/indicates an association between a second group of uplink signals and channels to be transmitted on the carrier by the UE and the uplink TAG2, and the TAG2 is associated with a second TA value. That is, the second configuration information of the carrier indicates that transmission of the second group of uplink signals and channels by the UE is according to the second TA value of the TAG2. The second configuration information may be transmitted by the TRP0 312 or the TRP1 314 to the UE 302. Similarly, the UE 302 may also receive third configuration information of the carrier, which includes/indicates an association of a third group of uplink signals and channels on the carrier with the uplink TAG3, and the TAG3 is associated with a third TA value. That is, the third configuration information of the carrier indicates that transmission of the third group of uplink signals and channels by the UE is according to the third TA value of the TAG3. The third configuration information may be transmitted by the TRP0 312 or the TRPn 322 to the UE 302. The first, second, and third configuration information of the carrier may be transmitted by the TRP0 312 in one message or separate messages. The UE 302 may then transmit, to the TRP0 312, a UL signal or a UL channel in the first group of UL signals or channels according to the first TA value. The UE 302 may transmit, to the TRP1 314, a UL signal or a UL channel in the second group of UL signals or channels according to the second TA value. The UE 302 may transmit, to the TRPn 322, a UL signal or a UL channel in the third group of UL signals or channels according to the third TA value. The first, second and third groups of UL signals and channels may be configured with a same subcarrier spacing (SCS) within a same BWP. Both the second and the third groups may be configured, or only one of the groups may be configured.

The serving cell 310 is associated with a first PCID and a first SSB. A UL signal or channel in the first group of UL signals or channels may be quasi-co-located (QCLed) to the first SSB, or QCLed to a downlink/uplink reference signal that is QCLed to the first SSB, or is configured with a pathloss RS that is the first SSB or is QCLed to the first SSB, or is configured with a spatial relation RS that is the first SSB or is QCLed to the first SSB. In an embodiment, all UL signal or channel in the first group of UL signals or channels are associated with the first TAG.

A UL signal or channel in the second group of UL signals or channels may be QCLed to a TRS of the TRP1 314, or to a downlink/uplink reference signal that is QCLed to the TRS of the TRP1 314, or is configured with a pathloss RS that is the TRS or is QCLed to the TRS of the TRP1 314. In an embodiment, all UL signal or channel in the second group of UL signals or channels are associated with the second TAG. In an embodiment of network deployment, a TRS of the TRP1 314 may be "approximately" QCLed to the first SSB of the serving cell or a TRS of the first SSB, even though the TRP1 314 is not co-located with the TRP0 312 broadcasting the first SSB/PCID, which generally requires that the TRPs are not far away from each other, operate in frequency range 1 (FR1), and serve UEs that do not have high mobility. Still a separate TAG from the TAG for the first SSB/PCID may be beneficial. In an embodiment of network deployment, the TRP1 314 may broadcast the first PCID on a SSB resource different from the first SSB transmitted by TRP0 312, even though the TRP1 314 is not co-located with the TRP broadcasting the first SSB/PCID. A separate TAG from the TAG for the first SSB/PCID may be configured for the TRP1 314. The SSBs associated with the same PCID but occupy different SSB resources within one SSB burst in FR2 are distinguished via SSB index, and hence each SSB index may be used to define a separate TAG if the SSBs with different SSB indexes are transmitted from non-co-located TRPs.

A UL signal or channel in the third group of UL signals or channels may be QCLed to a TRS of the TRPn1 322, QCLed to a second SSB associated with a neighbor cell that has a second PCID different than the first PCID, e.g., the cell

320, or QCLed to a PCID of a cell other than serving cells of the UE 302, or QCLed to a downlink/uplink reference signal that is QCLed to the TRS of the TRPn1 322 or the second SSB, or configured with a pathloss RS that is the TRS of the TRPn1 322 or the second SSB, or that is QCLed to the TRS of the TRPn1 322 or the second SSB. In an embodiment, all UL signal or channel in the third group of UL signals or channels are associated with the third TAG.

Figure 4:
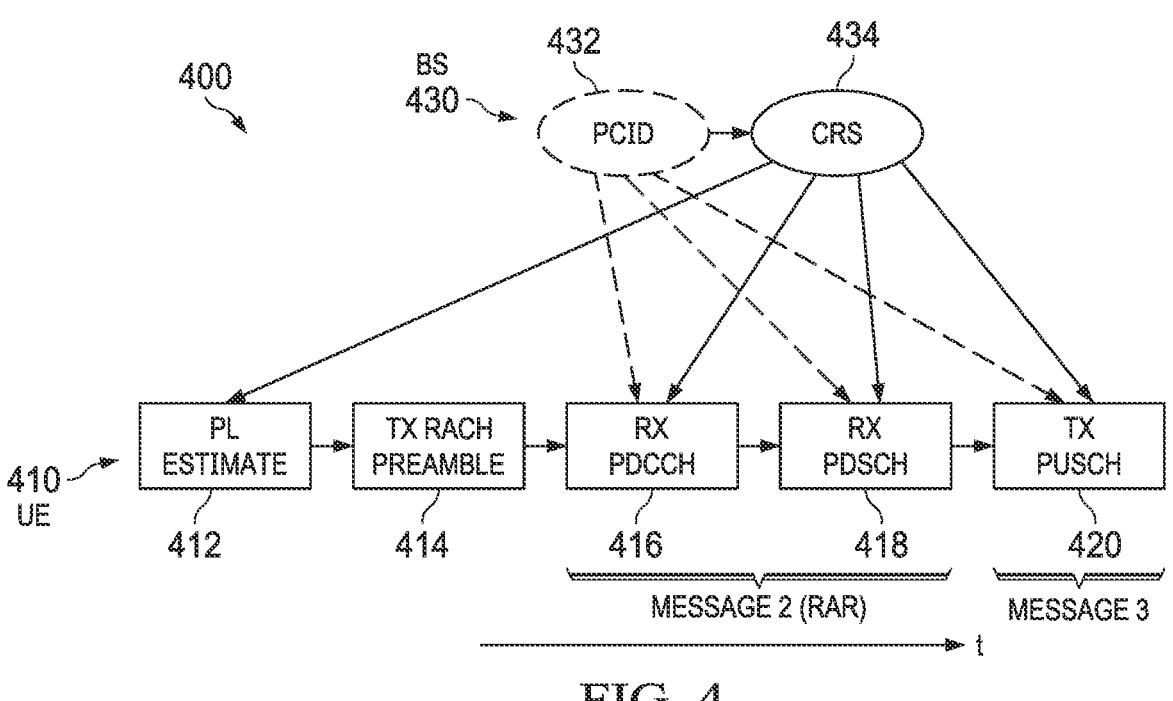
FIG. 4 illustrates a diagram showing an example random access procedure according to 4G LTE.

Conventionally, a UE perform random access with a serving cell, e.g., the serving cell 310, using a PCID and CSI-RSs of the serving cell. FIG. 4 illustrates a diagram showing a random access procedure 400 according to 4G LTE, highlighting parameter dependency. A UE 410 willing to establish a connection with a base station 430 to be configured as a serving cell may perform a random access procedure with the base station 430. The UE may also perform a random access procedure with a base station that is already configured as a serving cell if the UL timing is lost or if triggered by the network via a PDCCH order. The serving cell is associated with a PCID 432. The UE 410 performs path loss (PL) estimation (block 412) based on a CRS 434 transmitted by the base station 430, and transmits a random access channel (RACH) preamble to the base station 430 based on the PL estimation (block 414). In response, the UE 410 receives a random access response (RAR) message (i.e., message 2 (Msg 2)) from the base station 430, which includes receiving a PDCCH (block 416), and receiving a PDSCH (block 418). The UE 410 then transmits a PUSCH to the base station 430 in a message 3 (Msg 3) (block 420). In a non-contention based random access procedure, the UE 410 thus synchronizes with the base station 430, establishes the connection with the base station 430, and may thereafter communicate with the base station 430 according to a normal operation. During the random access procedure, the PCID 432 is used by the UE 410 as a scrambling and descrambling identity (ID) to scramble and descramble various signals, such as CSI-RS (CRS), uplink SRSs, PUSCH, PUCCH, DMRS, etc. The CRS 434 is used by the UE 410 to demodulate various downlink signals from the base station 430, e.g., PDCCH, PDSCH. Transmit power for uplink signals of the UE 410 is based on PL estimate obtained from the 434 CRS. In new radio (NR), CRS is eliminated, and PCID's roles are minimized.

Figure 5:
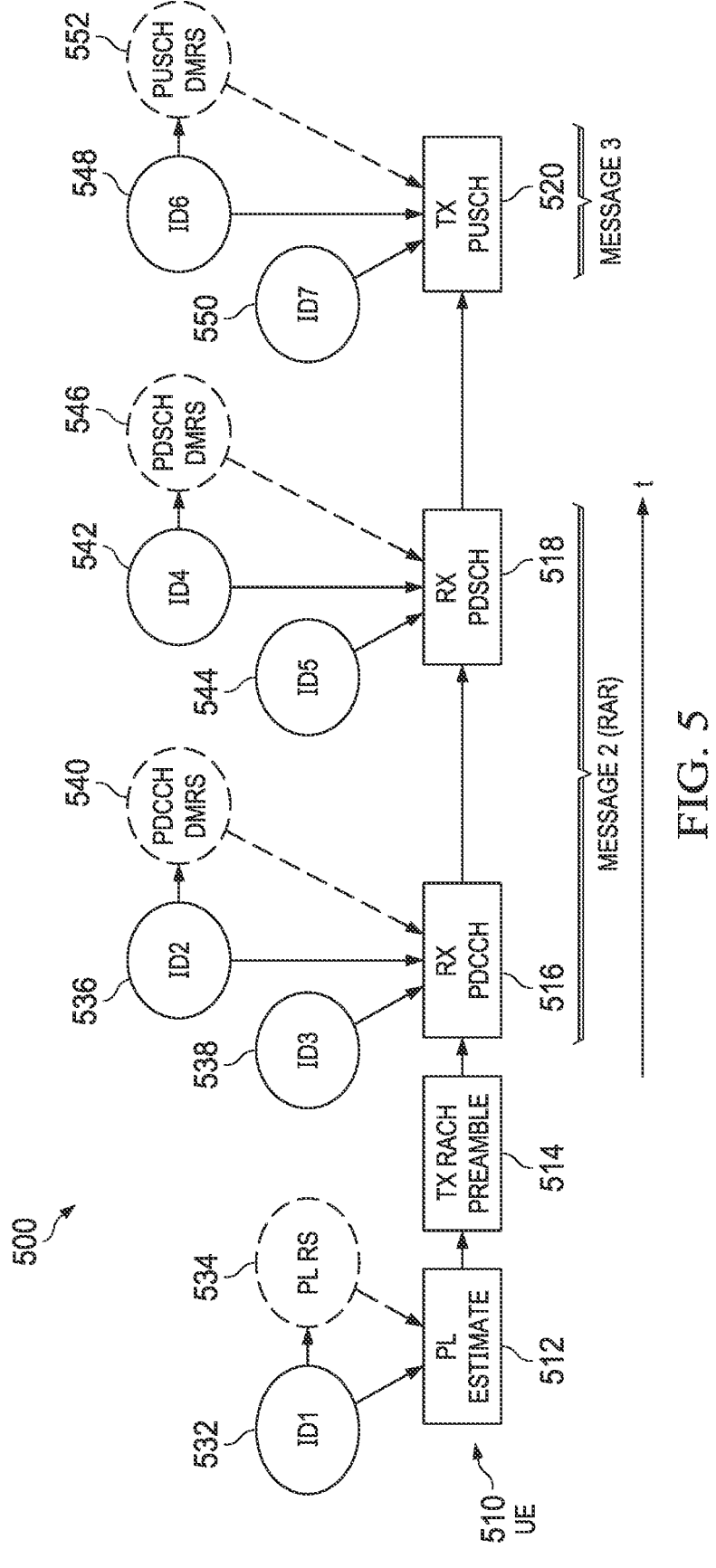
FIG. 5 illustrates a diagram of an embodiment random access procedure 500 with a transmit receive point (TRP) that is not configured as a serving cell.

As discussed above, the embodiment methods associate serving TRPs, which are QCLed to a non-serving cell's SSB directly/indirectly, or which are not QCLed to a serving cell's SSB, or not co-located with a serving cell's TRP(s) transmitting the serving cell's SSB, with TAGs separate from the serving cell's TAG, and a UE also needs to perform random access with the serving TRPs to obtain separate TAs. As used herein, a first RS may be QCLed to a second RS/SSB directly, for example, the UE is signaled with a QCL assumption for the first RS that refers to the second RS/SSB for a QCL type, e.g., the UE receives a QCL assumption indicating {the first RS: QCL Type C to the second RS}. A first RS may be QCLed to a second RS/SSB indirectly, for example, the UE is signaled with a QCL assumption for the first RS that refers to one or more RS/SSB, which are further referred to the second RS/SSB for QCL, via one or more QCL assumptions in a concatenated manner, e.g., the UE receives a QCL assumption indicating {the first RS: QCL Type C to a third RS}, {the third RS: QCL Type A to a fourth RS}, and {the fourth RS: QCL Type C to the second RS}. In other words, one QCL assumption defines a relationship/link between a source RS and a destination RS, and multiple QCL assumptions may define a chain of relationships/links that associate a RS, directly using one link or indirectly using multiple links, to another RS/SSB. If the serving TRPs are not associated with a PCID separate from that of the serving cell, new parameters used in exchanging messages during a random access procedure with one of the serving TRPs may be needed. FIG. 5 illustrates a diagram of an embodiment random access procedure 500 of a UE with a TRP that is not configured as a serving cell of the UE, e.g., the TRP1 314 or TRPn 322, highlighting parameters involved in the random access procedure 500. The random access procedure 500 is similar to what is illustrated with respect to FIG. 4, but uses different scrambling and descrambling IDs and different RSs for PL. As shown, a UE 510 performs PL estimation based on a PL RS 534 received from the TRP (block 512). An ID1 532 may be used to generate the PL RS sequence, e.g., used as the scrambling sequence for the PL RS 534. The UE 510 receives the PL RS 534 using the ID1 532. The UE 510 transmits a RACH preamble to the TRP based on the PL estimation (block 514). In response, the UE 510 receives an Msg 2 (i.e., RAR), where the UE 510 receives a PDCCH (block 516) and a PDSCH (block 518). A PDCCH DMRS 540 is dedicated to the PDCCH received in block 516 for demodulation of the PDCCH. An ID2 536 may be used to generate the PDCCH DMRS sequence, e.g., used as the scrambling sequence for the PDCCH DMRS 540. An ID3 538 may be used to scramble or randomize the PDCCH. The PDSCH received by the UE 510 has a dedicated PDSCH DMRS 546 for demodulation. An ID4 542 may be used to generate the PDSCH DMRS sequence, e.g., used as the scrambling sequence for the PDSCH DMRS 546. An ID5 544 may be used to scramble the bit sequence of the PDSCH. The UE 510 transmits a PUSCH to the TRP in an Msg 3 (block 520). A PUSCH DMRS 552 is dedicated to the PUSCH for modulation of the PUSCH. An ID6 548 may be used to generate the PUSCH DMRS sequence, e.g., used as the scrambling sequence for the PUSCH DMRS 552. An ID7 550 may be used scramble the bit sequence of the PUSCH. In this example, different scrambling/descrambling IDs are used for different signals transmitted or received during the random access procedure 500. A PCID of a serving cell may be reused for scrambling/descrambling certain signals, e.g., the PDCCH DMRS scrambling ID (ID2 536 and/or ID3 538) may not be configured with a different value and the PCID is used, or the PDSCH scrambling ID may not be configured with a different value and the PCID is used, and so on. A DMRS may be dedicated to each of some or all signals transmitted or received during the random access procedure 500. The PL RS is not based on the CRS, and may be a SSB or a CSI-RS configured to the UE. Scalable RACH procedures may be configured for various TRPs, e.g., dual connectivity (DC) TRPs, M-TRPs, non-standalone TRPs, with each TRP configured with a separate set of scrambling/descrambling IDs (referred to as IDs for illustrative convenience), and with RSs that may be associated with the TRP via QCL assumptions to the TRP's RS. For example, a PDCCH DMRS may be configured/indicated as being QCLed to a first SSB of a serving cell or a TRS of a non-serving cell, and an ID is configured for the PDCCH DMRS. Then the UE may receive the PDCCH DMRS with the configured ID, where the PDCCH DMRS and ID are associated with a TRP of the serving cell or a TRP of the non-serving cell. Thus, the QCL assumptions/relations (i.e., the PDCCH DMRS QCLed to the first SSB of the serving cell or to the TRS of the non-serving cell in this example) associate or link all involved RSs (i.e., the PDCCH DMRS in this example), channels associated with the RSs, and IDs associated with the RSs/channels, to the QCLed SSB or TRS (directly or indirectly via other UL/DL RS), and serve as an implicit way to group the signals/channels/IDs separately according to the corresponding TRPs.

FIG. 6 illustrates a table 600 showing example groups of IDs configured for different TRPs for use in random access procedures. The table 600 shows three groups of IDs 610, i.e., a first group of IDs for a first TRP1 associated with a TAG1 (and possibly a first beam), a second group of IDs for a second TRP2 associated with a TAG2 (and possibly a second beam), and a third group of IDs for a third TRP3 associated with a TAG3 (and possibly a third beam). Each group of IDs includes ID1-ID7 as discussed above with respect to FIG. 5. ID1 620 of these groups is supported in R15/16 for PL CSI-RS. R15/16 generally uses a PCID for ID2-ID7, and requires fast backhaul. Each group of IDs may be pre-configured and re-configured for an associated TRP. A UE may perform random access with a TRP using a group of IDs associated with a TAG of the TRP.

A UE may receive a physical downlink control channel (PDCCH), which may be a PDCCH order triggering a random access procedure, e.g., requesting the UE to transmit a random access preamble based on a DL RS. The PDCCH may be associated with a control resource set (CORESET) with a first CORESET pool index, or has a DMRS that is QCLed to a SSB, or has a TRS QCLed to the SSB. The DL RS may be QCLed to the SSB, may be the SSB, or may be a CSI-RS QCLed to the SSB or the TRS, or may be a TRS QCLed to the SSB. In response to transmitting the RACH preamble, the UE receives a TA command having a TA value of a TAG. If the SSB or TRS is associated with a serving cell of the UE, e.g., the cell 310 in FIG. 3, the UE may perform random access with the serving cell, and the TA value obtained by the UE is for the TAG of the serving cell over a carrier. In this case, the PDCCH may be transmitted by the serving cell of the UE via a TRP associated with the serving cell, such as the TRP0 312. If the SSB or TRS is not associated with a serving cell of the UE, e.g., the TRP1 314 (without an associated SSB) or TRPn 322 in FIG. 3, the UE may perform random access with the corresponding TRP, and the TA value obtained by the UE is for the TAG of the corresponding TRP. In this case, the PDCCH may be transmitted by the serving TRP of the UE, such as the TRP1 314 or TRPn 322. The UE may receive multiple PDCCHs, e.g., M-DCI, instructing the UE to perform random access with multiple TRPs, respectively.

FIGS. 7A and 7B illustrate embodiment TAG configurations 700. The TAG configurations may be signaled from a network to a UE in a RRC configuration signaling (L3 signaling). A TAG may be configured for a TRS (e.g., tag-Id in block 710), which is a NZP CSI-RS resource set including one or more NZP CSI-RS resources. Any signal/channel QCLed to this TRS is configured to be in the TAG identified by the tag-Id. This embodiment may be suitable for a TRS/TRP not transmitting any SSB or not QCLed to any SSB. A TAG may be configured for a NZP CSI-RS resource (e.g., block 722 with a tag-Id added, or blocks 772-724 with a tag-Id added in 724 (not shown in the figure as it may be optional)), and then any UL signal/channel QCLed to this NZP CSI-RS resource is configured, directly or indirectly, to be in the TAG identified by the tag-Id. This embodiment may be suitable for a TRS/TRP not transmitting any SSB or not QCLed to any SSB. A TAG may also be configured for a SSB (e.g., blocks 722-726). Block 726 shows an example IE that assigns a non-serving PCI/SSB with a tag-Id, and then any UL signal/channel QCLed to this SSB directly or indirectly is configured to be in the TAG identified by the tag-Id, e.g., 722 and 724 show that the NZP CSI-RS resource is QCLed to the SSB, and thus any UL signal/channel QCLed to the NZP CSI-RS resource directly or indirectly is configured to be in the TAG identified by the tag-Id. This embodiment may be suitable for a TRP transmitting a non-serving SSB or QCLed to a non-serving SSB. The non-serving SSB may not be configured for ServingCell-Config, or BWP or SCS, as it shares the same BWP/SCS configurations as the serving cell.

FIG. 8 illustrates an embodiment TAG configuration 800 for a non-serving SSB. A non-serving SSB is a SSB configured by the network to a UE, but the PCID used to identify/generate the SSB is not configured as a serving cell to the UE. A TAG may be configured using existing information elements originally designed for a serving SSB with appropriate changes. A tag-Id may be configured for the non-serving SSB, but may not necessarily need some fields that share the same configuration parameters as the serving SSB, e.g., a carrier frequency, SCS, or a system frame number (SFN). The corresponding RAM/2 specifications and UE behavior/assumptions may also be described in the configuration. A new category different from "serving cell" may be introduced, such as "non-serving cell" configuration, "non-serving SSB/PCI" configuration, "SSB-configuration" for a new release, reuse the "SSB-InfoNcell" to add tag-Id in it or in an IE of it.

Figure 9:
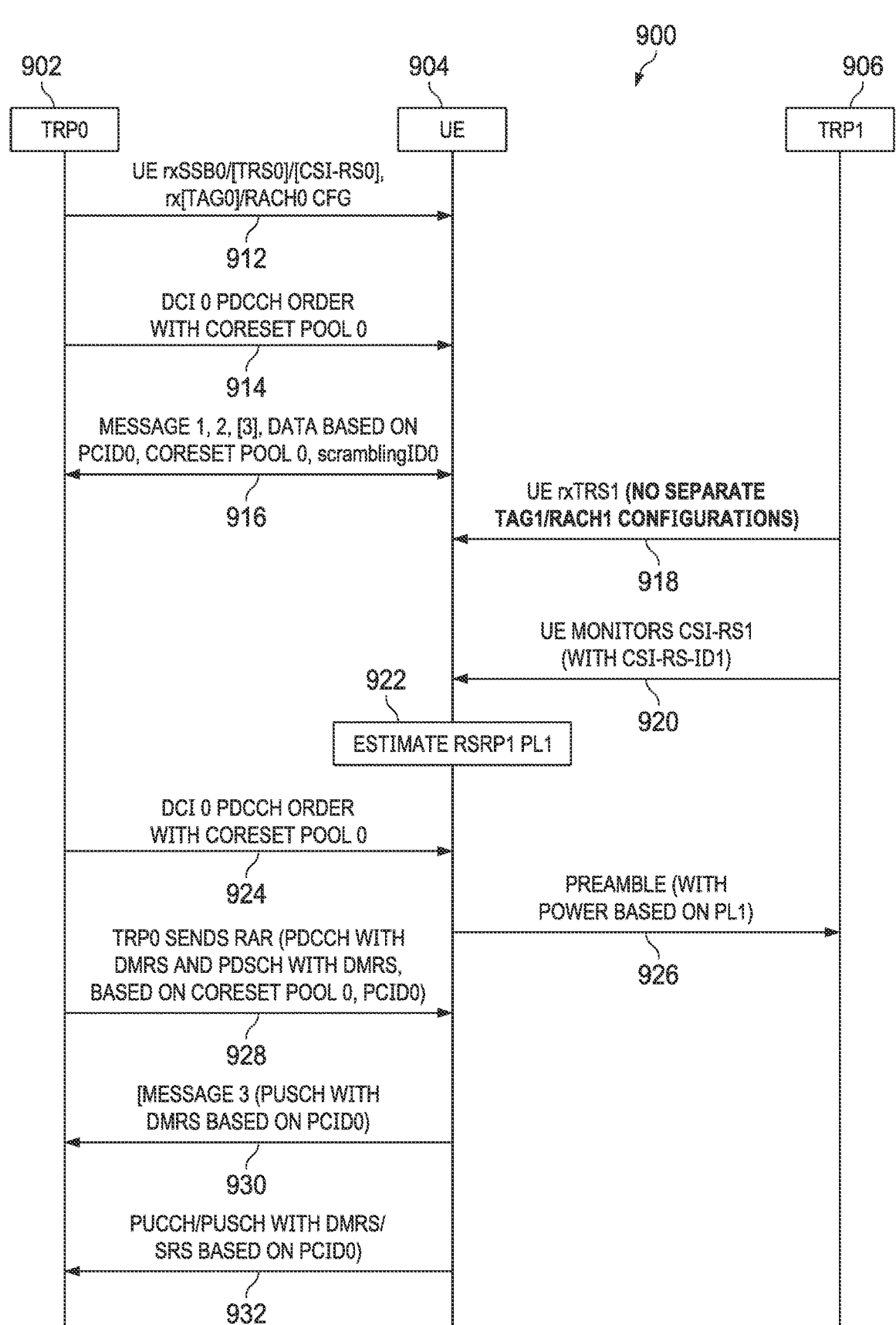
FIG. 9 illustrates a diagram of example messages exchanged and processing performed by devices participating in an M-DCI M-TRP communication according to 3GPP R16.

FIG. 9 illustrates a diagram 900 of example messages exchanged and processing performed by devices participating in an M-DCI M-TRP communication according to 3GPP R16, which does not allow multiple TAGs to be supported on one carrier and allows only random access to a TRP broadcasting SSB. This example may also apply to S-DCI M-TRP, but in general for S-DCI M-TRP, the timing of the multiple TRPs is very similar and may not need a separate TAG. Diagram 900 shows messages exchanged and processing performed by a TRP0 902, a UE 904, and a TRP1 906. The signals/channels/operations in brackets in FIG. 9, and similarly in other figures, may be optional. The TRP0 902 is configured as a serving cell of the UE 904 over a carrier, and the TRP1 906 is a co-channel serving TRP of the UE 904. As shown, the UE 904 receives, from the TRP0 902, information of SSB, TRS and/or CSI-RS of the TRP0 902 (e.g., SSB0/TRS0/CSI-RS0), configuration information for performing a random access process (e.g., RACH0) with the TRP0 902, and/or configuration information of a TAG0 of the TRP0 902 (step 912). The UE 904 may further receive a PDCCH order (DCI0 PDCCH order) associated with a CORESET pool 0 (step 914). In response, the UE 904 exchanges messages 1, 2 and/or 3 and data with the TRP0 902 based on a PCID0 of the TRP0 902, the CORESET pool 0 and a scrambling ID0 (step 916). Thus the UE 904 can acquire and maintain its TA with TRP0 902. The UE 904 may receive a TRS1 from the TRP1 906, but without a separate TAG and/or RACH (TAG1/RACH1) configuration for the TRP1 906 (step 918). The UE 904 may monitor CSI-RSs (CSI-RS1) with a CSI-RSID (CSI-RSID1) from the TRP1 906 (step 920), and estimate PL (RSRP1 PL1) with the TRP1 906 based on RSRP of the CSI-RS1 (step 922). The UE 904 may receive, from the TRP0 902, another DCI0 PDCCH order associated with the CORESET pool 0 (step 924). In response, the UE 904 may transmit a RACH preamble to the TRP1 906 with transmit power determined based on PIA estimated in step 922 (step 926). This appears as if the UE 904 initiates a random access procedure with the TRP1 906. The rest of the random access procedure may be completed by the UE with the TRP0 902 or the TRP1 906, but the UE does not maintain a separate TA for the TRP1 906 on the carrier. As shown, the UE 904 receives a RAR from the TRP0 902 in response to transmitting the RACH preamble to the TRP1 906 (step 928). The RAR includes a PDCCH with an associated DMRS and a PDSCH with an associated DMRS, which are transmitted based on the CORESET pool 0 and using the PCID0. The UE 904 responds, based on the PCID0, with an Msg 3 that includes a PUSCH with a DMRS (step 930). After synchronizing with the TRP0 902, the UE 904 may transmit, to the TRP0 902, one or more PUCCHs and/or PUSCHs with dedicated DMRS, and/or SRS, based on the PCID0 (step 932). However, 3GPP R16 does not make it clear how the UE can acquire ULTA to the TRP1 906 if different from the TA to the TRP0 902, and how the UE can transmit UL signals to the TRP1 906 with a different TA.

Figure 10:
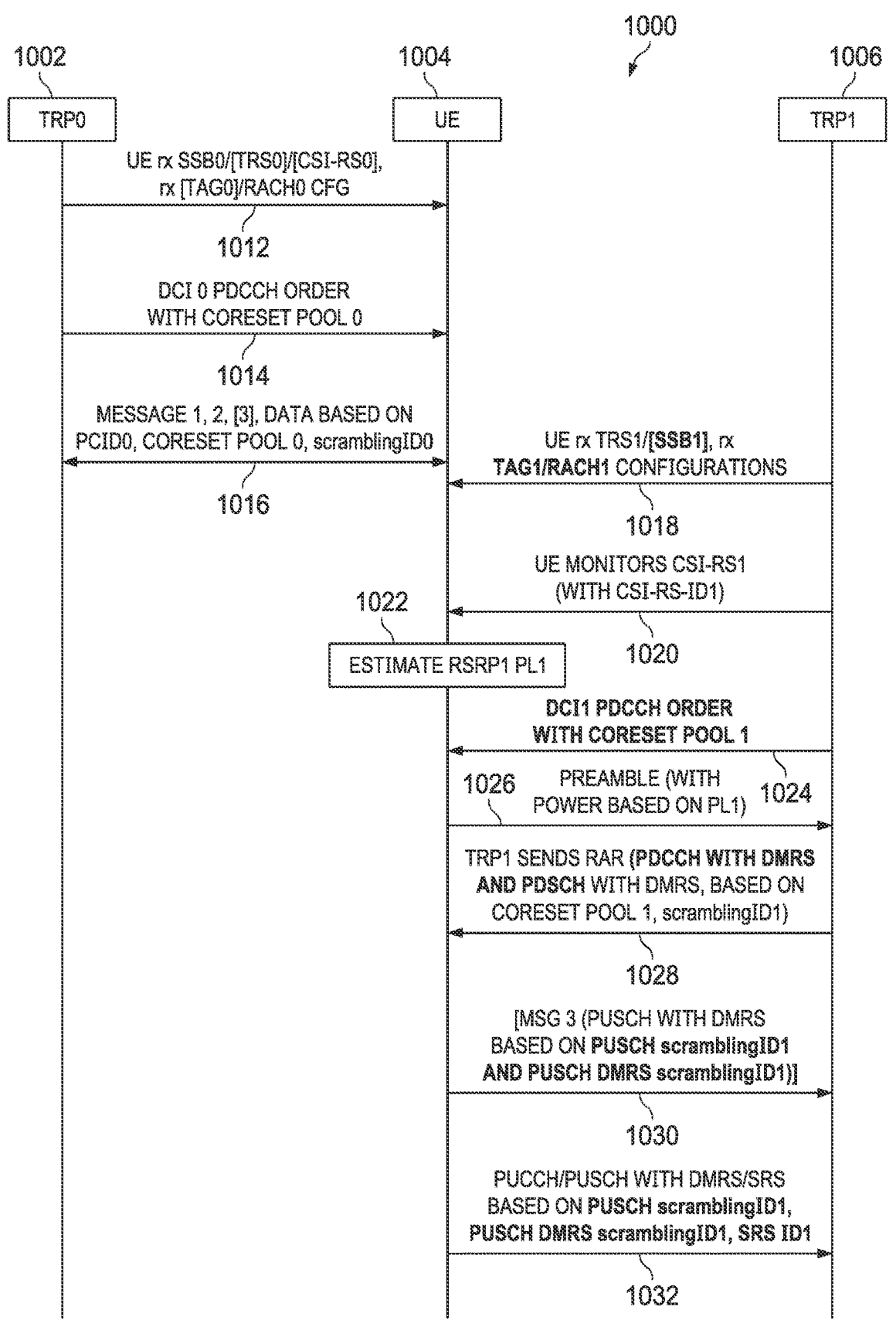
FIG. 10 illustrates a diagram of embodiment messages exchanged and processing performed by devices participating in an M-DCI M-TRP communication.

FIG. 10 illustrates a diagram 1000 of example messages exchanged and processing performed by devices participating in an M-DCI M-TRP communication on one carrier. Diagram 1000 shows messages exchanged and processing performed by a TRP0 1002, a UE 1004, and a TRP1 1006. The TRP0 1002 is configured as a serving cell (broadcasting SSB0/PCID of the serving cell) of the UE 1004 over a carrier, and the TRP1 1006 is a co-channel serving TRP of the UE 1004. Generally, the serving cell broadcasts a SSB0/PCID0 of the serving cell, but in some embodiments for intra-band carrier aggregation (CA), a SCell may not transmit a SSB, and the signals/channels for the SCell are QCLed to a SSB of another serving cell on another carrier within the same frequency band of the same TRP. For example, the UE 1004 is configured with two (2) carriers (e.g., carriers A and B) within a band, on carrier A, the UE 1004 is configured with a cell A with a first SSB, and on carrier B, the UE is configured with a cell B without SSB (e.g., specified by higher layer parameter scellWithoutSSB). The signals/channels for the cells are transmitted/received by the TRP0 1002. The UE 1004 receives the first SSB on cell A but not on cell B, and the signals/channels for the cell B are QCLed directly/indirectly with the first SSB on the cell A. Likewise, on the TRP1 1006, TRS may not be transmitted on the carrier (e.g., first carrier) but may be transmitted on a second (different) carrier that the TRP1 1006 is also operating on and configured to the UE 1004, and signals/channels to/from the TRP1 1006 on the first carrier may be QCLed directly/indirectly with the TRS transmitted on the second carrier. Steps 1012, 1014 and 1016 are generally similar to the steps 912, 914 and 916 in FIG. 9 to acquire and maintain TA with the TRP0 1002, and thus are not described herein again, but the SSB0 may be transmitted on the carrier or on a different carrier, and the TRS0 may be transmitted on the carrier or on a different carrier, and other signals/channels may be QCLed to the SSB0 and/or TRS0. Different from FIG. 9, in FIG. 10, the UE 1004 may receive a TRS1 or SSB1 from the TRP1 1006, and also receive configuration information of a separate TAG and/or RACH (TAG1/RACH1) from the TRP1 1006 (step 1018). The SSB1 may be transmitted on the carrier or on a different carrier (similar to the above scell-WithoutSSB description for the TRP0 1002), and the TRS1 may be transmitted on the carrier or on a different carrier (similar to the above description for the TRP1 1006 without transmitting a TRS on the carrier), and other signals/channels may be QCLed to the SSB1 and/or TRS1. The UE 1004 may monitor CSI-RSs (CSI-RS1) with a CSI-RS ID (CSI-RSID1) from the TRP1 1006 (step 1020), and estimate PL (RSRP1PL1) with the TRP1 1006 based on RSRP of the CSI-RS1 (step 1022). The CSI-RS1 may be scrambled using the CSI-RS ID1. The UE 1004 receives a PDCCH order (DCI1 PDCCH order) associated with a CORESET pool (Coreset pool 1) (step 1024). The DCI1 PDCCH order triggers the UE 1004 to perform RACH with the TRP1 1006. The UE 1004 transmits a preamble to the TRP1 1006 with transmit power determined based on the PIA (step 1026). The TRP1 1006 sends a RAR to the UE 1004 (step 1028). The RAR may include a PDCCH with an associated DMRS and a PDSCH with an associated DMRS, which are transmitted based on the Coreset pool 1 and using a scrambling ID1 of the TRP1 1006 (scramblingID1). The UE 1004 sends an Msg 3 back to the TRP1 1006 (step 1030). The Msg 3 may include a PUSCH with an associated DMRS. The PUSCH is scrambled using a PUSCH scrambling ID (PUSCH scrambling ID1), and the DMRS is scrambled using a PUSCH DMRS scrambling ID (PUSCH DMRS scrambling ID1). The UE 1004 may transmit to the TRP1 1006, after synchronizing with the TRP1 1006, one or more PUCCHs (scrambled using the PUSCH scrambling ID1), PUSCHs (scrambled using the PUSCH scrambling ID1) with associated DMRS (scrambled using the PUSCH DMRS scrambling ID1), and/or SRS (scrambled using a SRS ID1) (step 1032). The PUSCH scramblingID may be called dataScramblingIdentityPUSCH, and for the M-TRPs, they may be called dataScramblingIdentityPUSCH and dataScramblingIdentityPUSCH2 (or AdditionaldataScramblingIdentityPUSCH). In addition, if a higher layer signaling index per CORESET is configured, such as CORESET-PoolIndex is configured, dataScramblingIdentityPUSCH is associated with a higher layer signaling index per CORE-SET and is applied to the PUSCH scheduled with a DCI detected on a CORESET with the same higher layer index, e.g., dataScramblingIdentityPUSCH is associated with CORESETPoolIndex being 0 (or no explicit index), and AdditionaldataScramblingIdentityPUSCH is associated with CORESETPoolIndex being 1. The DMRS for the PUSCH may be done likewise, which generally have another set of scrambling identities and now need to be increased for M-TRP PUSCH DMRS.

Table 1 below shows numbers of PCIDs per carrier, numbers of TAGs per carrier, and numbers of RACH configurations per carrier according to existing 3GPP standards (Releases) and embodiments of the present disclosure. For existing configurations, at most one (1) PCID/TAG/RACH configuration can be allowed for a carrier, even if multiple TRPs may be on the carrier. With the embodiment designs, more than 1 PCID/TAG/RACH configuration may be allowed for a carrier.

TABLE 1

|  | # PCIDs/<br>carrier | # TAGs/<br>carrier | # RACH config/<br>carrier |
|---|---|---|---|
| R15 | 1 | 1 | 1 |
| R16 intra-cell M-TRP | 1 | 1 | 1 |
| CA | 1 | 1 | 1 |
| DC | 1 | 1 | 1 |
| Embodiment intra-<br>cell M-TRP | 1 | 2 | 2 |
| Embodiment inter-<br>cell M-TRP | 2 | 2 | 2 |

FIG. 11 illustrates a table 1100 showing example M-TRP scenarios for RACH/TAGs and observation as a result of analysis of the scenarios. In this example, "Cell w/SSB" refers to a standalone cell with a standalone SSB/PCID, and a TRP of the cell broadcasts the SSB/PCID. Such a TRP may be referred to as a standalone TRP, e.g., the TRP0 312 in FIG. 3. A standalone TRP transmits a SSB/PCID of a cell, so that the cell can be found by a UE, e.g., during a cell search/initial access procedure. The UE may then connect to the TRP (or cell) after finding the cell. "TRP w/o SSB" refers to a non-standalone TRP without a standalone SSB/PCID, or non-standalone TRP that can share a SSB/PCID with a standalone cell; the TRP itself does not transmit a SSB/PCID of a cell. Such a TRP may be referred to as a non-standalone TRP, e.g., the TRP1 314 if not transmitting a SSB. A non-standalone TRP may not transmit a SSB/PCID of a cell. The UE may first connect to a standalone TRP/cell, receive information about the non-standalone TRP, and communicate with the non-standalone TRP. "Tightly synched" refers to two TRPs synchronized with a timing error of at most a few percent of a CP length, e.g., generally negligible. Table 1100 shows 8 example scenarios (scenarios 1-8) including situations such as cell and TRPs (cell/TRPs) that are tightly synchronized, cell/TRPs that are not tightly synchronized, cell/TRPs with fast backhaul, cell/TRPs with no fast backhaul, cell/TRPs with single-downlink control information (S-DCI) or multi-DCI (M-DCI). The analysis shows that at least for large cells or not-tightly synched cell/TRPs, separate TAGs and random access procedure or PRACHs are desirous. In all the scenarios, separate TAGs may be configured for separate TRPs, for better UL TA accuracy. The random access may be contention based or non-contention based. TAGs may not be cell-based, but TRP-based, e.g., a cell with an associated SSB may be configured as a TRP, not as a serving cell.

Figure 12:
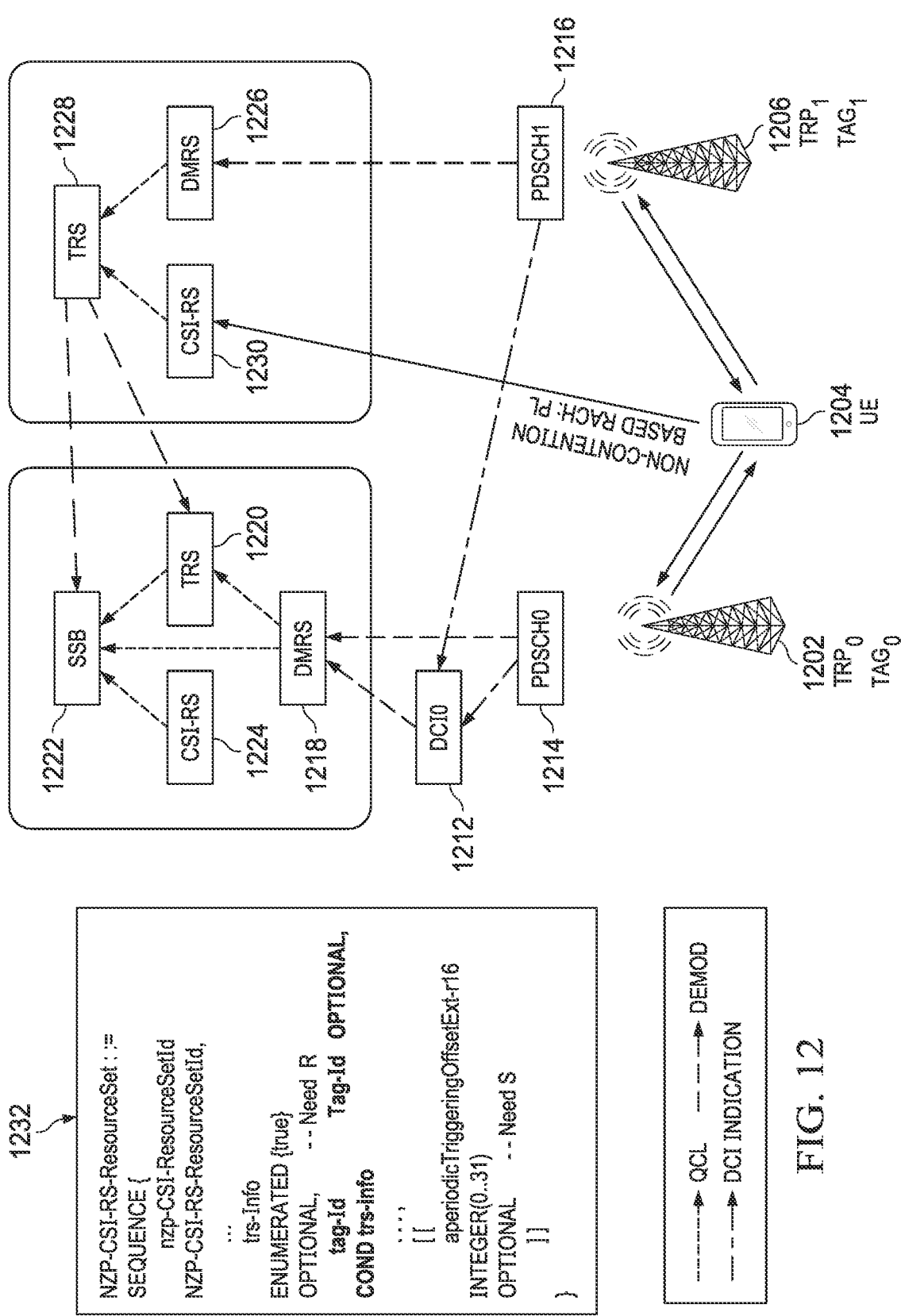
FIG. 12 illustrates a diagram of an embodiment scenario in FIG. 11.

FIG. 12 illustrates a diagram 1200 of the example scenario 1 shown in Table 1100 of FIG. 11. The diagram 1200 shows a TRP0 1202 configured as a serving cell of a UE 1204 over a carrier. A TRP1 1206 not configured as a serving cell of the UE 1204 over the same carrier is non-co-located with the TRP0 1202. The TRP0 1202 and the TRP1 1206 provide M-TRP communication services to UEs in the serving cell. In this example, the TRP0 1202 and the TRP1 1206 are synchronized with each other and have fast backhaul between the TRP0 1202 and the TRP1 1206. Separate TAGs (i.e., TAG0 and TAG1) may be configured for the TRP0 1202 and the TRP1 1206, which enables the UE 1204 to obtain improved UL TA with each of the TRP0 1202 and the TRP1 1206. The resulting benefits include improved UL spectrum efficiency (SE), sounding performance and TDD DL CSI acquisition. The TRP0 1202 transmits, to the UE 1204, a PDCCH order instructing the UE 1204 to initiate a random access procedure, and the PDCCH order may indicate which of the TRP0 1202 and the TRP1 1206 that the UE 1204 is to perform the random access procedure with. For example, the PDCCH order may request the UE 1204 to send a RACH preamble to the TRP1 1206, or to the TRP0 1202. The TRP0 1202 also transmits DCI (DCI0 1212) to the UE 1204 scheduling a PDSCH (PDSCH0 1214) from the TRP0 1202, or a PDSCH (PDSCH1 1216) from the TRP1 1206, and the DCI/PDSCH may be the RAR as part of the random access procedure, or may be for other DL data transmissions. In this example, only the TRP0 1202 sends DCI to the UE 1204 (i.e., S-DCI). DMRS (DMRS 1218) is used for modulation/demodulation of the DCI0 1212 and the PDSCH0 1214. The DMRS 1218 may be QCLed to a TRS 1220 of the TRP0 1202. The TRS 1220 of the TRP0 1202 may be QCLed to a SSB 1222 associated with the serving cell (the TRP0 1202). The TRP0 1202 may also transmit CSI-RS 1224 to the UE 1204 for channel measurement. The CSI-RS 1224 may be QCLed to the SSB 1222 or QCLed to the TRS 1220. DMRS (DMRS 1226) is used for modulation/demodulation of the PDSCH1 1216 of the TRP1 1206. The DMRS 1226 may be QCLed to a TRS 1228 of the TRP1 1206. The TRP1 1206 not configured as the serving cell does not have an associated SSB. The TRP1 1206 transmits the TRS 1228, and the TRS 1228 may be QCLed to the SSB 1222 or QCLed to the TRS 1220 with a weak QCL assumption (such as QCL Type C, or even QCL for average delay only). In general, for TRPs not co-located, they may only share rough/coarse time/frequency synchronization such as slot/OFDM symbol boundaries and subcarrier/PRB alignment, but not Doppler shift, Doppler spread, average gain, delay spread, spatial receive parameters, etc. However, if the TRPs are not too far away from each other and tightly synchronized, QCL Type C to the SSB 1222 or TRS 1220 may be assumed. The TRP1 1206 may send CSI-RS 1230 to the UE 1204, base on which the UE 1204 may estimate PL between the UE 1204 and the TRP1 1206, and send a RACH preamble (e.g., non-contention based) in a random access procedure to the TRP1 1206 based on the estimated PL. The CSI-RS 1230 may be QCLed to the TRS 1228. In this example, the PL is based on the CSI-RS of the TRP1 1206, and the RACH to the TRP1 1206 is based on the PL. However, other steps of the random access procedure are performed between the UE 1204 and the TRP0 1202 based on the TRP0 1202 and a PCID associated with the SSB 1222 (this is similar to what is specified in R16). An example configuration of the separate TAGs for the TRP0 1202 and the TRP1 1206 is shown in block 1232.

Figure 13:
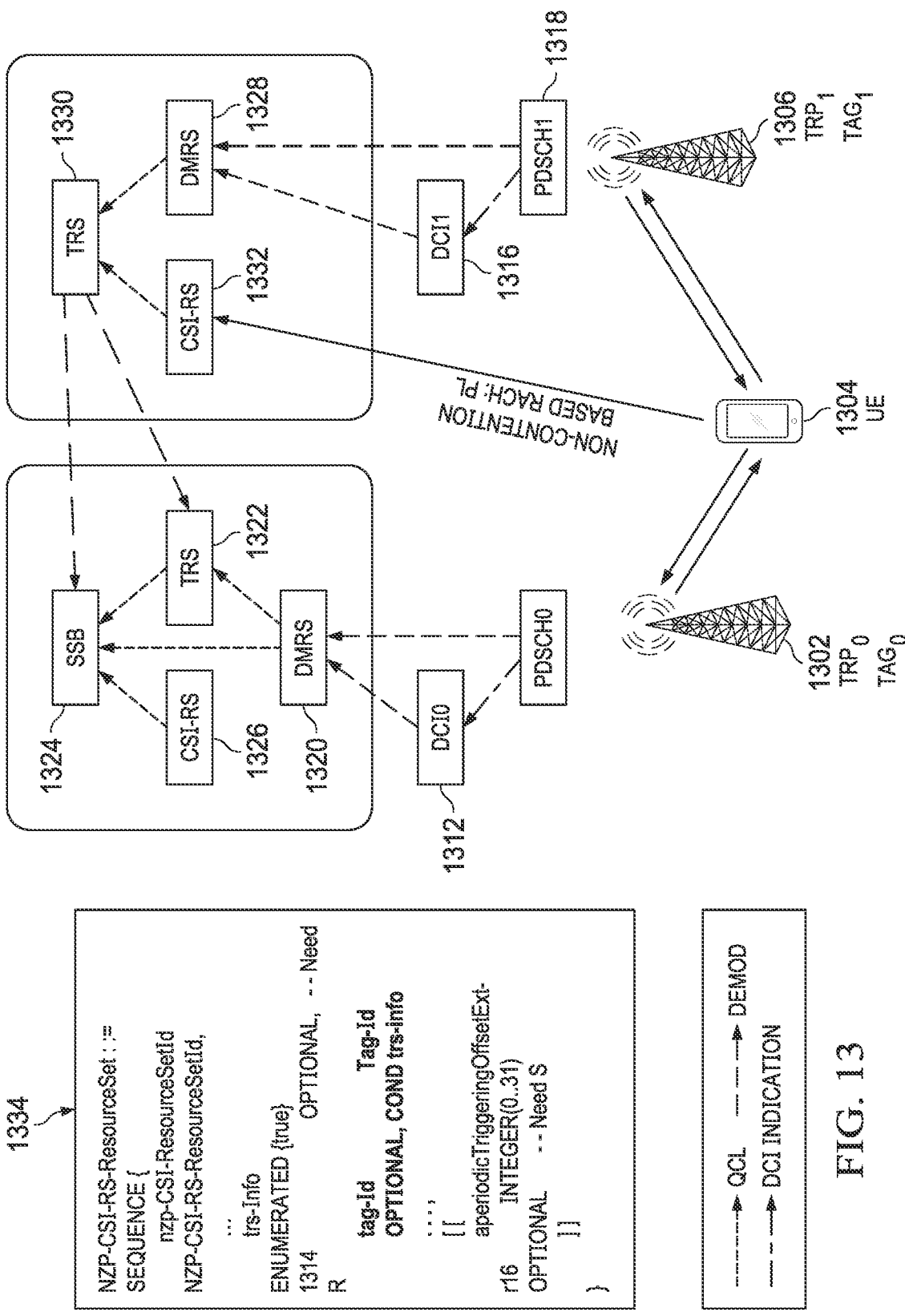
FIG. 13 illustrates a diagram of another embodiment scenario in FIG. 11.

FIG. 13 illustrates a diagram 1300 of the example scenario 2 shown in Table 1100 of FIG. 1100. The diagram 1330 shows a TRP0 1302 configured as a serving cell of a UE 1304 over a carrier. A TRP1 1306 not configured as a serving cell of the UE 1304 is co-channel with the TRP0 1302. The TRP0 1302 and the TRP1 1306 provide M-TRP communication services to UEs in the serving cell. In this example, the TRP0 1302 and the TRP1 1306 are synchronized with each other and have fast backhaul between the TRP0 1302 and the TRP1 1306. Separate TAGs (i.e., TAG0 and TAG1) are configured for the TRP0 1302 and the TRP1 1306.

Different from the scenario 1 of FIG. 12, in this example, each of the TRP0 1302 and the TRP1 1306 may send a PDCCH order instructing the UE 1304 to initiate a random access procedure with a TRP, i.e., the TRP0 1302 or the TRP1 1306. For example, the TRP0 1302 may send a PDCCH order requesting the UE 1304 to send a RACH preamble to the TRP0 1302 or to the TRP1 1306. Similarly, the TRP1 1306 may send a PDCCH order requesting the UE 1304 to send a RACH preamble to the TRP0 1302 or to the TRP1 1306. In an example, the PDCCH order may include an indication to indicate which of the TRP0 1302 or the TRP1 1306 that the UE 1304 is to send the RACH preamble to. In another example, the PDCCH order does not include such indication, and the UE 1304 determines that the TRP who sends the PDCCH order is the one that the UE 1304 is to send the RACH preamble to. The TRP0 1302 and the TRP1 1306 transmit their respective DCI for scheduling their respective PDSCHs. For example, as shown, the TRP0 1302 transmits DCI (DCI0 1312) to the UE 1304 scheduling a PDSCH (PDSCH0 1314) from the TRP0 1302. The TRP1 1306 transmits DCI (DCI0 1316) to the UE 1304 scheduling a PDSCH (PDSCH1 1318) from the TRP1 1306. In this example, both the TRP0 1302 sends DCI to the UE 1304 (i.e., M-DCI). The DCI/PDSCH may be the RAR as part of the random access procedure, or may be for other DL data transmissions. DMRS (DMRS 1320) is used for modulation/demodulation of the DCI0 1312 and the PDSCH0 1314. The DMRS 1320 may be QCLed to a TRS 1322 of the TRP0 1302. The TRS 1322 of the TRP0 1302 may be QCLed to a SSB 1324 associated with the serving cell (the TRP0 1302). A CSI-RS 1326 of the TRP0 1302 may be QCLed to the SSB 1324. DMRS (DMRS 1328) is used for modulation/demodulation of the DCL1 1316 and the PDSCH1 1318 of the TRP1 1306. The DMRS 1328 may be QCLed to a TRS 1330 of the TRP1 1306. The TRP1 1306 not configured as a serving cell of the UE 1304 does not have an associated SSB. The TRP1 1306 may send CSI-RS 1332 to the UE 1304, base on which the UE 1304 may estimate PL between the UE 1304 and the TRP1 1306, and send a RACH preamble (e.g., non-contention based) in a random access procedure to the TRP1 1306 based on the estimated PL. The CSI-RS 1332 may be QCLed to the TRS 1330. In this example, the PL is based on the CSI-RS of the TRP1 1306, and the RACH to the TRP1 1306 is based on the PL. However, other steps of the random access procedure are performed between the UE 1304 and the TRP0 1302 based on the TRP0 1302 and a PCID associated with the SSB 1324 (this is similar to what is specified in R16). An example configuration of the separate TAGs for the TRP0 1302 and the TRP1 1306 is shown in block 1334.

Figure 14:
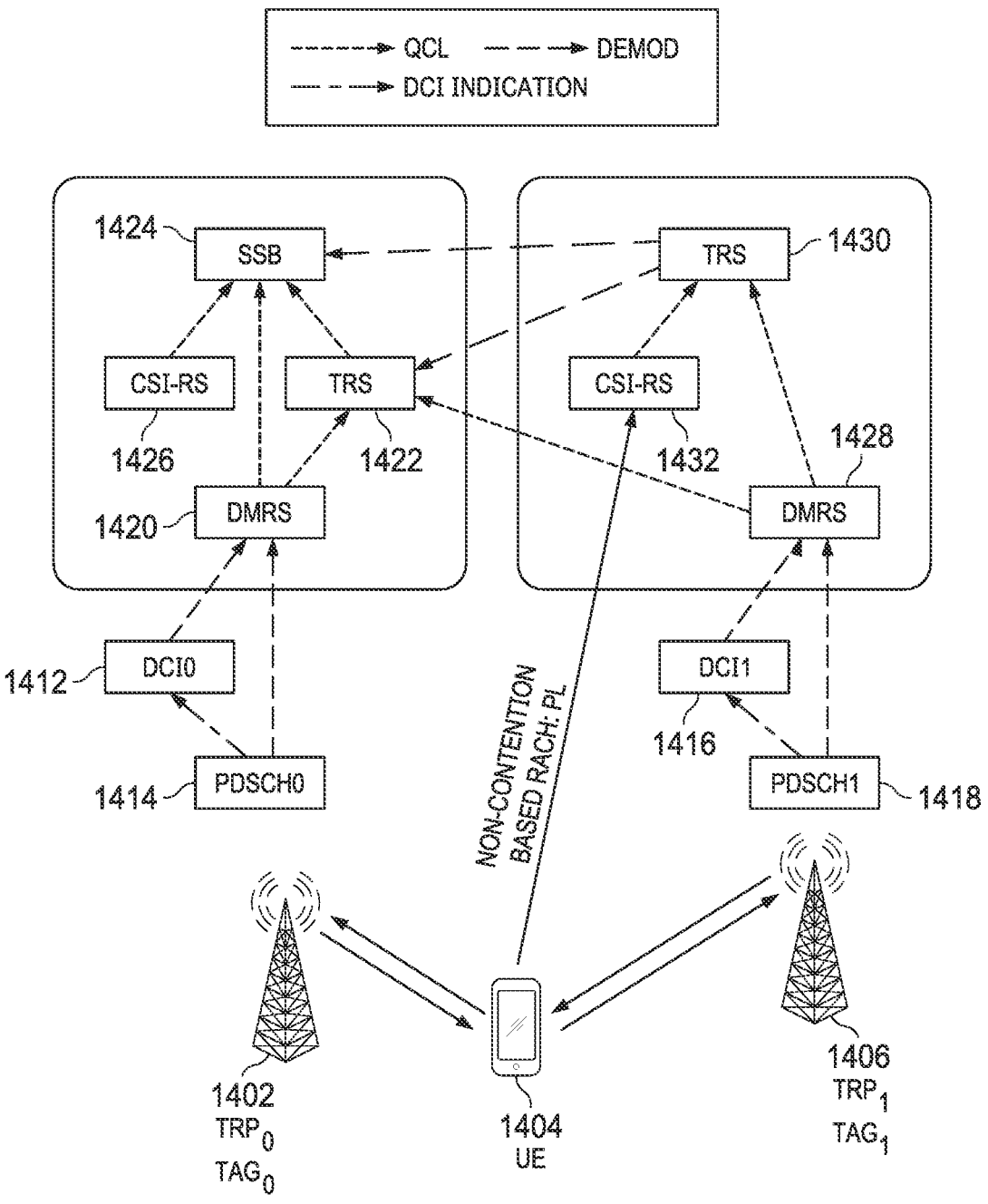
FIG. 14 illustrates a diagram of two embodiment scenarios in FIG. 11.

FIG. 14 illustrates a diagram 1400 of the example scenarios 3 and 4 shown in Table 1100 of FIG. 11. The diagram 1400 shows a TRP0 1402 configured as a serving cell of a UE 1404 over a carrier. A TRP1 1406 not configured as a serving cell is co-channeled with the TRP0 1402. The TRP0 1402 and the TRP1 1406 provide M-TRP communication services to UEs in the serving cell. In this example, the TRP0 1402 and the TRP1 1406 may be or may not be synchronized (or not sufficiently synchronized) with each other, and don't have fast backhaul between the TRP0 1402 and the TRP1 1406. Separate TAGs (i.e., TAG0 and TAG1) are configured for the TRP0 1402 and the TRP1 1406. In this example, each of the TRP0 1402 and the TRP1 1406 may send a PDCCH order instructing the UE 1404 to initiate a random access procedure with a TRP, i.e., the TRP0 1402 or the TRP1 1406. The PDCCH order may indicate or imply which TRP that the UE 1404 is to send a RACH preamble similarly to those discussed above with respect to FIG. 13. The TRP0 1402 and the TRP1 1406 transmit their respective DCI for scheduling their respective PDSCHs. For example, as shown, the TRP0 1402 transmits DCI (DCI0 1412) to the UE 1404 to schedule a PDSCH (PDSCH0 1414) from the TRP0 1402. The TRP1 1406 transmits DCI (DCI0 1416) to the UE 1404 to schedule a PDSCH (PDSCH1 1418) from the TRP1 1406. In this example, both the TRP0 1402 sends DCI to the UE 1404 (i.e., M-DCI). DMRS (DMRS 1420) is used for modulation/demodulation of the DCI0 1412 and the PDSCH0 1414. The DMRS 1420 may be QCLed to a TRS 1422 of the TRP0 1402. The TRS 1422 of the TRP0 1402 may be QCLed to a SSB 1424 associated with the serving cell (the TRP0 1402). A CSI-RS 1426 may be QCLed to the SSB 1424. DMRS (DMRS 1428) is used for modulation/demodulation of the DCI1 1416 and the PDSCH1 1418 of the TRP1 1406. The DMRS 1428 may be QCLed to a TRS 1430 of the TRP1 1406. The TRP1 1406 may send a CSI-RS 1432 to the UE 1404, base on which the UE 1404 may estimate PL between the UE 1404 and the TRP1 1406, and send a RACH preamble (e.g., non-contention based) in a random access procedure to the TRP1 1406 based on the estimated PL. In this example, the PL is based on the CSI-RS of the TRP1 1406, and the RACH to the TRP1 1406 is based on the PL. The CSI-RS 1432 may be QCLed to the TRS 1430. In this example, RAR may be based on a DMRS, CORESETs and data scrambling ID of the TRP1 1406. PUSCH and DMRS of the UE 1404 also need corresponding scrambling ID(s). The TRP1 1406 transmits the TRS 1430, and the TRS 1430 may be QCLed to the SSB 1424 or QCLed to the TRS 1422 with a weak QCL assumption (such as QCL Type C, or QCL for average delay only, or QCL for only coarse time/frequency synchronization of slot/OFDM symbol/subcarrier/PRB boundaries).

Figure 15:
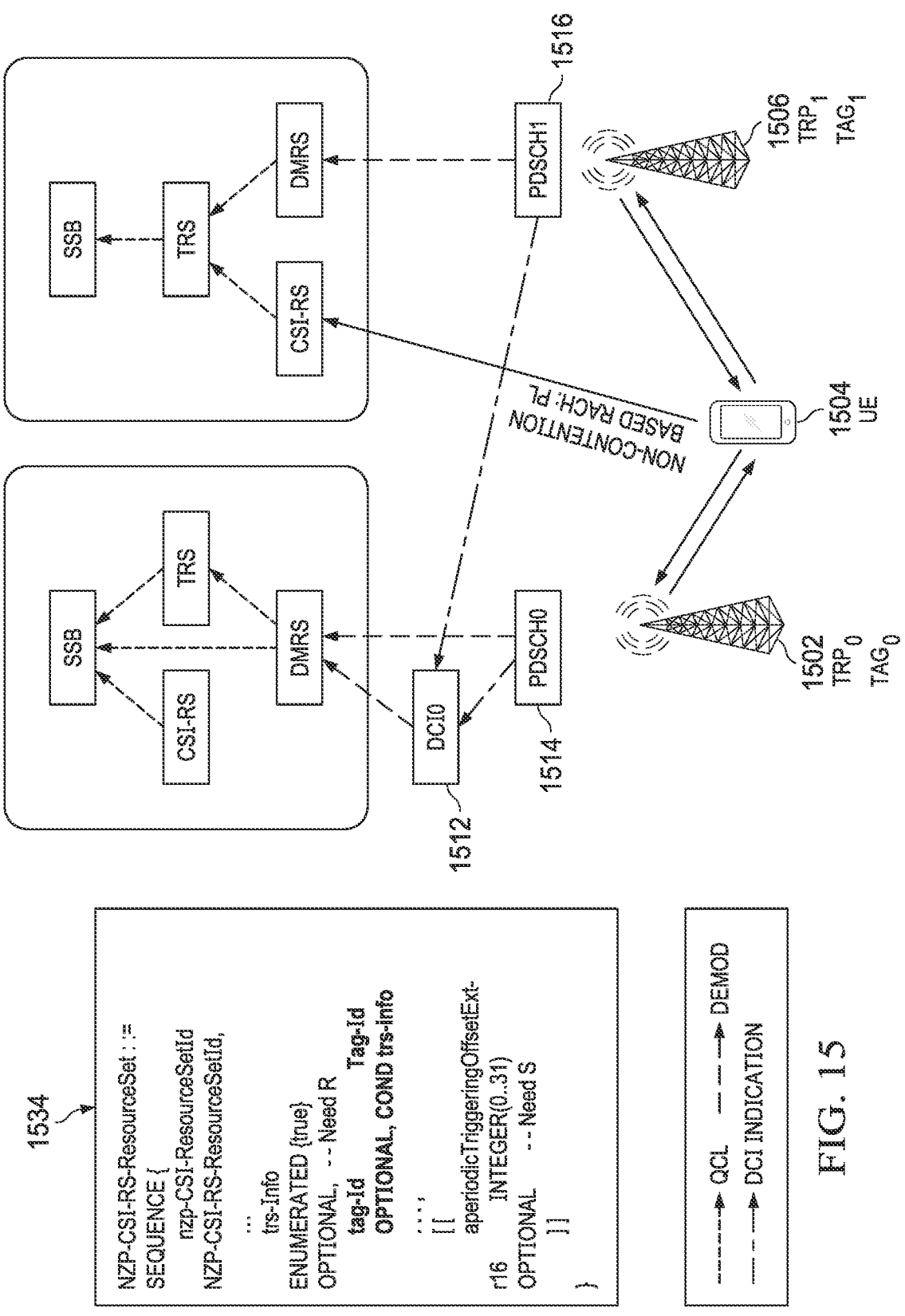
FIG. 15 illustrates a diagram of another embodiment scenario in FIG. 11.

FIG. 15 illustrates a diagram 1500 of the example scenario 5 shown in Table 1100 of FIG. 1100. The diagram 1500 shows a TRP0 1502 configured as a serving cell of a UE 1504 over a carrier. The serving cell is associated with a SSB 1524. A TRP1 1506 is associated with a SSB 1530 but not configured as a secondary cell of the UE 1504. The TRP0 1502 and the TRP1 1506 provide M-TRP communication services to UEs over the carrier. In this example, the TRP0 1502 and the TRP1 1506 are synchronized with each other for communication between the TRP0 1502 and the TRP1 1506. Separate TAGs (i.e., TAG0 and TAG1) are configured for the TRP0 1502 and the TRP1 1506. The TRP0 1502 may transmit, to the UE 1504, a PDCCH order instructing the UE 1504 to initiate a random access procedure, and may indicate which of the TRP0 1502 and the TRP1 1506 that the UE 1504 is to send a RACH preamble. For example, the PDCCH order may request the UE 1504 to send a RACH preamble to the TRP1 1506, or to the TRP0 1502. The TRP0 1502 transmits DCI (DCI0 1512) to the UE 1504 for scheduling a PDSCH (PDSCH0 1514) from the TRP0 1502, or a PDSCH (PDSCH1 1516) from the TRP1 1506, as part of the random access procedure, or may be for other DL data transmissions. In this example, only the TRP0 1502 sends DCI to the UE 1504 (i.e., S-DCI). DMRS (DMRS 1518) is used for modulation/demodulation of the DCI0 1512 and the PDSCH0 1514. The DMRS 1518 may be QCLed to a TRS 1520 of the TRP0 1502. The TRS 1520 of the TRP0 1502 may be QCLed to the SSB 1522 associated with the serving cell (the TRP0 1502). The TRP0 1502 may also transmit CSI-RS 1524 to the UE 1504 for channel measurement. The CSI-RS 1524 may be QCLed to the SSB 1522. DMRS (DMRS 1526) is used for modulation/demodulation of the PDSCH1 1516 of the TRP1 1506. The DMRS 1526 may be QCLed to a TRS 1528 of the TRP1 1506. Different from the scenario 1 of FIG. 12, in this example, the TRP1 1506 is associated with the SSB 1530. The SSB 1530 may be configured to associate with the TAG1, but not configured as a secondary cell (SCell) of the UE 1404. The TRS 1528 may be QCLed to the SSB 1530. The TRP1 1506 may send a CSI-RS 1532 to the UE 1504, base on which the UE 1504 may estimate PL between the UE 1504 and the TRP1 1506, and send a RACH preamble (e.g., non-contention based) in a random access procedure to the TRP1 1506 based on the estimated PL. The CSI-RS 1532 may be QCLed to the TRS 1528. In this example, the PL is based on the CSI-RS of the TRP1 1506, and the RACH to the TRP1 1506 is based on the PL. However, other steps of the random access procedure are performed between the UE 1504 and the TRP0 1502 based on the TRP0 1502 and a PCID associated with the SSB 1522 (this is similar to what is specified in R16). An example configuration of the separate TAGs for the TRP0 1502 and the TRP1 1506 is shown in block 1534. The scrambling IDs used with TRP1 1506 may be based on the associated non-serving SSB, or may be configured for one or more of signals/channels for transmissions with the TRP1 1506.

Figure 16:
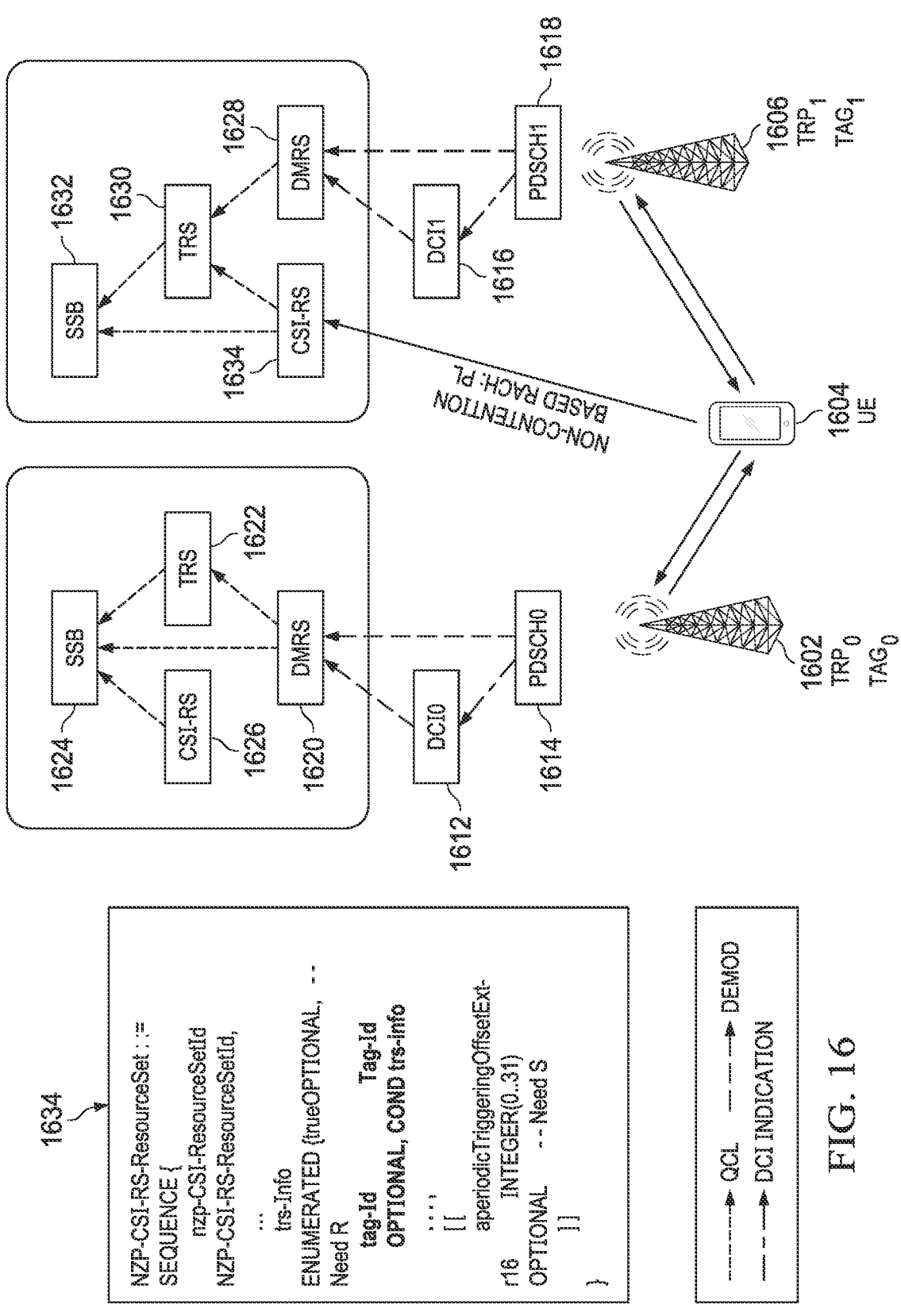
FIG. 16 illustrates a diagram of three embodiment scenarios in FIG. 11.

FIG. 16 illustrates a diagram 1600 of the example scenarios 6, 7, and 8 as shown in Table 1100 of FIG. 1100. The diagram 1600 shows a TRP0 1602 configured as a serving cell of a UE 1604 over a carrier. The serving cell is associated with a SSB 1624. A TRP1 1606 is associated with a SSB 1630, and the TRP1 1606 may be or not be configured as a secondary cell of the UE 1604 over the carrier. The TRP0 1602 and the TRP1 1606 provide M-TRP communication services to UEs over the carrier. In this example, the TRP0 1602 and the TRP1 1606 may be or may not be synchronized with each. Separate TAGs (i.e., TAG0 and TAG1) are configured for the TRP0 1602 and the TRP1 1606. TRP0 1602 transmits TRS/CSI-RS/DMRS which can be QCLed to the associated SSB 1624, directly or indirectly via other RS. TRP1 1606 transmits TRS/CSI-RS/DMRS which can be QCLed to the associated SSB 1632, directly or indirectly via other RS. For example, in the case of spatial division multiplex (SDM) with overlapping time/frequency resources, multiple PDSCH DMRS ports are QCLed to TRS/CSI-RS of the respective TRPs (e.g., QCL Type A), and the TRS/CSI-RS are further QCLed to the SSBs of the respective TRPs (e.g., QCL Type A). For another example, in the case of SDM with overlapping time/frequency resources, the multiple PDSCH DMRS ports are directly QCLed to the SSBs of the respective TRPs (e.g., QCL Type A). Note that the PDSCH DMRS ports may not be in one CDM group as they are for different TRPs with non-negligible timing difference or far away from each other. Likewise, PDCCH DMRS ports may also need to have such QCL/TCI states configured, but the PDCCH DMRS ports for one PDCCH are all from one TRP. FDM/TDM may also be considered in similar but generally simpler ways.

Each of the TRP0 1602 and the TRP1 1606 may send a PDCCH order instructing the UE 1604 to initiate a random access procedure. In this example, a PDCCH order is linked to a TRP. That is, The PDCCH order itself implies that the UE 1604 initiate a random access procedure to the TRP linked with the PDCCH order. The TRP0 1602 and the TRP1 1606 transmit their respective DCI scheduling their respective PDSCHs. For example, as shown, the TRP0 1602 transmits DCI (DCI0 1612) to the UE 1604 scheduling a PDSCH (PDSCH0 1614) from the TRP0 1602. The TRP1 1606 transmits DCI (DCI0 1616) to the UE 1604 scheduling a PDSCH (PDSCH2 1618) from the TRP1 1606. In this example, both the TRP0 1602 sends DCI to the UE 1604 (i.e., M-DCI). DMRS (DMRS 1620) is used for modulation/demodulation of the DCI0 1612 and the PDSCH0 1614. The DMRS 1620 may be QCLed to a TRS 1622 of the TRP0 1602. The TRS 1622 of the TRP0 1602 may be QCLed to the SSB 1624 associated with the serving cell (the TRP0 1602). A CSI-RS 1626 may be QCLed to the SSB 1624. DMRS (DMRS 1628) is used for modulation/demodulation of the DCI2 1616 and the PDSCH1 1618 of the TRP1 1606. The DMRS 1628 may be QCLed to a TRS 1630 of the TRP1 1606. The TRS 1630 of the TRP1 1606 may be QCLed to the SSB 1632 associated with the TRP1 1606.

The SSB 1632 may be configured to associate with the TAG1, but not configured as a SCell of the UE 1604. The TRS 1630 may be QCLed to the SSB 1632. The TRP1 1606 may send a CSI-RS 1634 to the UE 1604, base on which the UE 1604 may estimate PL between the UE 1604 and the TRP1 1606, and send a RACH preamble (e.g., non-contention based) in a random access procedure to the TRP1 1606 based on the estimated PL. The CSI-RS 1634 may be QCLed to the TRS 1640 or the SSB 1632. In this example, the PL is based on the CSI-RS of the TRP1 1606, and the RACH to the TRP1 1606 is based on the PL. However, other steps of the random access procedure (e.g., RAR) are performed between the UE 1604 and the TRP0 1602 based on the TRP0 1602 and a PCID associated with the SSB 1624 (this is similar to what is specified in R16). An example configuration of the separate TAGs for the TRP0 1602 and the TRP1 1606 is shown in block 1634. The scrambling IDs used with TRP1 1606 may be based on the associated non-serving SSB

1632, or may be configured for one or more of signals/channels for transmissions with the TRP1 1606.

FIG. 17 illustrates a flowchart of an embodiment method 1700 for wireless communications. The method 1700 may be indicative of operations by a user equipment (UE). As shown, at step 1702, the UE receives first configuration information of a carrier of a serving cell, where the first configuration information includes a first association of a first group of uplink (UL) signals or channels on the carrier in the serving cell with a first UL timing advance group (TAG) of the UE, and the first UL TAG is associated with a first UL timing advance (TA) value. At step 1704, the UE receives second configuration information of the carrier, where the second configuration information includes a second association of a second group of UL signals or channels on the carrier with a second UL TAG of the UE, and the second UL TAG is associated with a second UL TA value. At step 1706, the UE transmits a UL signal or channel in the first group of UL signals or channels according to the first TA value, and transmits a UL signal or channel in the second group of UL signals or channels according to the second TA value. In an embodiment, in addition to step 1704, the UE may further receive third configuration information of a different carrier, where the third configuration information includes a third association of a third group of UL signals or channels on the different carrier with the second UL TAG of the UE, and the second UL TAG is associated with the second UL TA value. At step 1706, the UE transmits a UL signal or a UL channel in the first group of UL signals or channels according to the first TA value, and transmits a UL signal or a UL channel in the second and/or third group of UL signals or channels according to the second TA value. This may apply to the scenario of carrier aggregation for the second TAG, which includes both the carrier and the different carrier (for an inter-cell TRP, for example).

FIG. 18 illustrates a flowchart of an embodiment method 1800 for wireless communications. The method 1800 may be indicative of operations by a base station (BS). As shown, at step 1802, the BS transmits, to a user equipment (UE) in a serving cell, first configuration information of a carrier of the serving cell, where the first configuration information includes a first association of a first group of uplink (UL) signals or channels on the carrier in the serving cell with a first UL timing advance group (TAG) of the UE, and the first UL timing advance group includes a first UL timing advance (TA) value. At step 1804, the BS transmits, to the UE, second configuration information of the carrier, where the second configuration information includes a second association of a second group of UL signals or channels on the carrier with a second UL TAG of the UE, and the second UL TAG includes a second UL TA value. At step 1806, the BS receives a UL signal or channel in the first group of UL signals or channels that is transmitted by the UE according to the first UL TA value of the first UL TAG.

FIG. 19 illustrates a flowchart of an embodiment method 1900 for wireless communications. The method 1900 may be indicative of operations by a base station (BS). As shown, at step 1902, the BS transmits, to a user equipment (UE) in a serving cell, first configuration information of a carrier of the serving cell, where the first configuration information includes a first association of a first group of uplink (UL) signals or channels on the carrier of the serving cell with a first UL timing advance group (TAG) of the UE, and the first group of UL signals or channels is QCLed to a CSI-RS for tracking (TRS) unassociated with the serving cell, QCLed to a first SSB different than a second SSB associated with the serving cell, or QCLed to a downlink/uplink reference signal that is QCLed to the TRS or the first SSB. At step 1904, the BS receives a UL signal or channel in the first group of UL signals or channels that is transmitted by the UE according to the first UL TA value of the first UL TAG.

Embodiments of the present disclosure may be implemented as computer-implemented methods. The embodiments may be performed by a processing system. FIG. 20 illustrates a block diagram of an embodiment processing system 2000 for performing methods described herein, which may be installed in a host device. As shown, the processing system 2000 includes a processor 2004, a memory 2006, and interfaces 2010-2014, which may (or may not) be arranged as shown in FIG. 20. The processor 2004 may be any component or collection of components adapted to perform computations and/or other processing related tasks, and the memory 2006 may be any component or collection of components adapted to store programming and/or instructions for execution by the processor 2004. In an embodiment, the memory 2006 includes a non-transitory computer readable medium. The interfaces 2010, 2012, 2014 may be any component or collection of components that allow the processing system 2000 to communicate with other devices/components and/or a user. For example, one or more of the interfaces 2010, 2012, 2014 may be adapted to communicate data, control, or management messages from the processor 2004 to applications installed on the host device and/or a remote device. As another example, one or more of the interfaces 2010, 2012, 2014 may be adapted to allow a user or user device (e.g., personal computer (PC), etc.) to interact/communicate with the processing system 2000. The processing system 2000 may include additional components not depicted in FIG. 20, such as long term storage (e.g., non-volatile memory, etc.).

In some embodiments, the processing system 2000 is included in a network device that is accessing, or part otherwise of, a telecommunications network. In one example, the processing system 2000 is in a network-side device in a wireless or wireline telecommunications network, such as a base station, a relay station, a scheduler, a controller, a gateway, a router, an applications server, or any other device in the telecommunications network. In other embodiments, the processing system 2000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 2010, 2012, 2014 connects the processing system 2000 to a transceiver adapted to transmit and receive signaling over the telecommunications network. FIG. 21 illustrates a block diagram of a transceiver 2100 adapted to transmit and receive signaling over a telecommunications network. The transceiver 2100 may be installed in a host device. As shown, the transceiver 2100 comprises a network-side interface 2102, a coupler 2104, a transmitter 2106, a receiver 2108, a signal processor 2110, and a device-side interface 2112. The network-side interface 2102 may include any component or collection of components adapted to transmit or receive signaling over a wireless or wireline telecommunications network. The coupler 2104 may include any component or collection of components adapted to facilitate bi-directional communication over the network-side interface 2102. The transmitter 2106 may include any component or collection of components (e.g., up-converter, power amplifier, etc.) adapted to convert a baseband signal into a modulated carrier signal suitable for transmission over the network-side interface 2102. The receiver 2108 may include any component or collection of components (e.g., down-converter, low noise amplifier, etc.) adapted to convert a carrier signal received over the network-side interface 2102 into a baseband signal. The signal processor 2110 may include any component or collection of components adapted to convert a baseband signal into a data signal suitable for communication over the device-side interface(s) 2112, or vice-versa. The device-side interface(s) 2112 may include any component or collection of components adapted to communicate data-signals between the signal processor 2110 and components within the host device (e.g., the processing system 2000, local area network (LAN) ports, etc.).

The transceiver 2100 may transmit and receive signaling over any type of communications medium. In some embodiments, the transceiver 2100 transmits and receives signaling over a wireless medium. For example, the transceiver 2100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2102 comprises one or more antenna/radiating elements. For example, the network-side interface 2102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for wireless communications, comprising:
receiving, by a user equipment (UE), first configuration information of a carrier of a serving cell, the first configuration information including a first association of a first group of uplink (UL) signals or channels on the carrier in the serving cell with a first UL timing advance group (TAG) of the UE, the first UL TAG associated with a first UL timing advance (TA) value;
receiving, by the UE, second configuration information of the carrier, the second configuration information including a second association of a second group of UL signals or channels on the carrier with a second UL TAG of the UE, the second UL TAG associated with a second UL TA value;
transmitting, by the UE, a first UL signal or channel in the first group of UL signals or channels according to the first UL TA value; and
transmitting, by the UE, a second UL signal or channel in the second group of UL signals or channels according to the second UL TA value.

2. The method of claim 1, wherein the serving cell is associated with a first physical cell identifier (PCID) and a first synchronization signal block (SSB) transmitted on the carrier or a different carrier, and the first UL signal or channel in the first group of UL signals or channels is quasi-co-located (QCLed) to the first SSB, or is QCLed to a downlink/uplink reference signal (RS) that is QCLed to the first SSB, or the first UL signal or channel in the first group of UL signals or channels is configured with a pathloss RS that is QCLed to the first SSB.

3. The method of claim 1, wherein the second UL signal or channel in the second group of UL signals or channels is QCLed to a second channel state information-reference signal (CSI-RS) for tracking (TRS) transmitted on the carrier or a different carrier, to a second SSB transmitted on the carrier or a different carrier associated with a neighbor cell that has a second PCID different than a first PCID associated with the serving cell or a PCID of any one of serving cells of the UE, or to a downlink/uplink reference signal that is QCLed to a second TRS or the second SSB, or the second UL signal or channel in the second group of UL signals or channels is configured with a pathloss RS that is QCLed to the second TRS or the second SSB.

4. The method of claim 2, further comprising:
receiving, by the UE, a first physical downlink control channel (PDCCH), the first PDCCH being associated with at least one of a control resource set (CORESET) with a first CORESET pool index, or the first PDCCH having a demodulation reference signal (DMRS) that is QCLed to the first SSB, or a first TRS QCLed to the first SSB.

5. The method of claim 4, wherein the first PDCCH is a first PDCCH order requesting the UE to transmit a first random access preamble based on a first downlink (DL) RS QCLed to the first SSB, based on which the UE receives a TA command comprising a TA value for the first UL TAG, wherein the first DL RS is the first SSB or a first CSI-RS QCLed to the first SSB.

6. The method of claim 4, wherein the first PDCCH is a second PDCCH order indicating the second UL TAG and requesting the UE to transmit a second random access preamble based on a second DL RS QCLed to a second TRS or a second SSB, based on which the UE receives a TA command comprising a TA value for the second UL TAG, the second DL RS being the second SSB or a second CSI-RS QCLed to the second TRS or the second SSB.

7. The method of claim 3, further comprising:
receiving, by the UE, a second PDCCH, the second PDCCH being associated with at least one of a CORESET with a second CORESET pool index, or the second PDCCH having a DMRS that is QCLed to the second SSB, or a second TRS QCLed to the second SSB.

8. The method of claim 7, wherein the second PDCCH is a third PDCCH order requesting the UE to transmit a third random access preamble based on a third DL RS QCLed to the second TRS or the second SSB, based on which the UE receives a TA command comprising a TA value for the second UL TAG, wherein the third DL RS is the second SSB or a third CSI-RS QCLed to the second TRS or the second SSB.

9. The method of claim 3, wherein:
the first group of UL signals or channels is transmitted using the first PCID as a first scrambling ID or a first group of scrambling IDs pre-configured for the first group of UL signals or channels; and the second group of UL signals or channels is transmitted using a second group of scrambling IDs pre-configured for the second group of UL signals or channels or using the second PCID associated with the second SSB as a second scrambling ID.

10. The method of claim 1, wherein each of the first UL TAG and the second UL TAG is associated with a corresponding TAG ID uniquely identifying a respective UL TAG.

11. The method of claim 1, wherein the first group of UL signals or channels and the second group of UL signals or channels are configured with a same subcarrier spacing (SCS) within a same bandwidth part (BWP).

12. A method for wireless communications, comprising:

transmitting, by a base station (BS) to a user equipment (UE) in a serving cell, first configuration information of a carrier of the serving cell, the first configuration information including a first association of a first group of uplink (UL) signals or channels on the carrier in the serving cell with a first UL timing advance group (TAG) of the UE, wherein the first UL TAG comprises a first UL timing advance (TA) value;

transmitting, by the BS to the UE, second configuration information of the carrier, the second configuration information including a second association of a second group of UL signals or channels on the carrier with a second UL TAG of the UE, wherein the second UL TAG comprises a second UL TA value; and receiving, by the BS, a UL signal or channel in the first group of UL signals or channels that is transmitted by the UE according to the first UL TA value of the first UL TAG.

13. The method of claim 12, wherein the serving cell is associated with a first primary cell identifier (PCID) and a first synchronization signal block (SSB), and the first group of UL signals or channels is quasi-co-located (QCLed) to the first SSB, or is QCLed to a downlink/uplink reference signal that is QCLed to the first SSB, or is configured with a pathloss RS that is QCLed to the first SSB.

14. The method of claim 12, wherein the second group of UL signals or channels is QCLed to a second CSI-RS for tracking (TRS) unassociated with the serving cell, to a second SSB different than a first SSB, or to a downlink/uplink reference signal that is QCLed to the second TRS or the second SSB, or is configured with a pathloss RS that is QCLed to the second TRS or the second SSB.

15. An apparatus, comprising:

a non-transitory memory storage storing instructions; and one or more processors in communication with the non-transitory memory storage, wherein the instructions, when executed by the one or more processors, cause the apparatus to perform:

receiving first configuration information of a carrier of a serving cell, the first configuration information including a first association of a first group of uplink (UL)

signals or channels on the carrier in the serving cell with a first UL timing advance group (TAG) of the apparatus, wherein the first UL TAG is associated with a first UL timing advance (TA) value;

receiving second configuration information of the carrier, the second configuration information including a second association of a second group of UL signals or channels on the carrier with a second UL TAG of the apparatus, wherein the second UL TAG is associated with a second UL TA value;

transmitting a first UL signal or channel in the first group of UL signals or channels according to the first UL TA value; and transmitting a second UL signal or channel in the second group of UL signals or channels according to the second UL TA value.

16. A system, comprising:

a user equipment (UE), configured to perform:

receiving first configuration information of a carrier of a serving cell, the first configuration information including a first association of a first group of uplink (UL) signals or channels on the carrier in the serving cell with a first UL timing advance group (TAG) of the UE, the first UL TAG associated with a first UL timing advance (TA) value;

receiving second configuration information of the carrier, the second configuration information including a second association of a second group of UL signals or channels on the carrier with a second UL TAG of the UE, the second UL TAG associated with a second UL TA value; and transmitting a first UL signal or channel in the first group of UL signals or channels according to the first UL TA value; and transmitting a second UL signal or channel in the second group of UL signals or channels according to the second UL TA value; and a first base station (BS), configured to perform:

transmitting the first configuration information to the UE; and receiving, from the UE, the first UL signal or channel in the first group of UL signals or channels according to the first UL TA value.

17. The system of claim 16, wherein the first BS is further configured to transmit the second configuration information to the UE.

18. The system of claim 16, further comprising a second BS, the second BS configured to perform:

receiving, from the UE, the second UL signal or channel in the second group of UL signals or channels according to the second UL TA value.

19. The system of claim 18, wherein the second BS is further configured to transmit the second configuration information to the UE.

\* \* \* \* \*